United States Patent
Wang et al.

(10) Patent No.: US 8,131,998 B2
(45) Date of Patent: Mar. 6, 2012

(54) TRANSPARENT AUTHENTICATION OF CONTINUOUS DATA STREAMS

(75) Inventors: Xinyuan Wang, Clifton, VA (US); Songqing Chen, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 994 days.

(21) Appl. No.: 12/042,578

(22) Filed: Mar. 5, 2008

(65) Prior Publication Data

US 2008/0222414 A1  Sep. 11, 2008

Related U.S. Application Data

(60) Provisional application No. 60/892,944, filed on Mar. 5, 2007.

(51) Int. Cl.
*H04L 29/06* (2006.01)
*H04K 1/06* (2006.01)
*H04J 3/06* (2006.01)

(52) U.S. Cl. .......... 713/161; 380/37; 380/255; 713/150; 713/176; 370/465; 370/529

(58) Field of Classification Search .................. 713/150, 713/161; 380/37, 255; 709/225, 226, 229, 709/233
See application file for complete search history.

(56) References Cited

U.S. PATENT DOCUMENTS

| | | | |
|---|---|---|---|
| 6,047,374 A * | 4/2000 | Barton .......................... | 713/150 |
| 6,959,384 B1 * | 10/2005 | Serret-Avila .................. | 713/176 |
| 7,155,585 B2 * | 12/2006 | Lam et al. ..................... | 711/162 |
| 7,822,073 B2 * | 10/2010 | Wang et al. ................... | 370/516 |
| 2008/0080558 A1 * | 4/2008 | Wang et al. ................... | 370/474 |
| 2008/0222420 A1 * | 9/2008 | Serret-Avila .................. | 713/176 |
| 2009/0210707 A1 * | 8/2009 | De Lutiis et al. ............. | 713/170 |

OTHER PUBLICATIONS

"DaTA—Data-Transparent Authentication Without Communication Overhead", Chen et. al, SecureComm 2006 Conference, Aug. 29-31, 2006.*

* cited by examiner

*Primary Examiner* — Matthew Henning
*Assistant Examiner* — Linglan Edwards
(74) *Attorney, Agent, or Firm* — David Grossman; David Yee

(57) ABSTRACT

A system, apparatus and method for transparently authenticating continuous data streams. A continuous data stream is divided into data blocks. Block authentication code(s) are determined using the data in the data blocks, a hash function and a key. The block authentication code(s) are embedded into the data block(s) by adjusting the timing between the packets in the data block(s). Timing delays may be used to separate the blocks. The continuous data stream may be received and authenticated by comparing an extracted block authentication code with a new calculated content-based block authentication code.

22 Claims, 24 Drawing Sheets

AUTHENTICATION SCENARIOS

| $n - \delta = f$ bits | $\delta$ bits | Current Data Block | Other Implications |
|---|---|---|---|
| match | match | true | None |
| mis-match | match | false | Current data block changed |
| match | mis-match | true | Proceeding data block loss/deletion or alteration |
| mis-match | mis-match | false | Current data block changed |

FIG. 3

Locate Packet Loss: Uniform Jitter Distribution (1%)

8,131,998 B2

TRANSPARENT AUTHENTICATION OF CONTINUOUS DATA STREAMS

CROSS-REFERENCE TO RELATED APPLICATIONS

This application claims the benefit of U.S. Provisional Application No. 60/892,944, filed Mar. 5, 2007, entitled "Transparent Authentication of Continuous Data Streams without Communications Overhead," which is hereby incorporated by reference in its entirety.

BACKGROUND

With the development of Internet computing techniques, continuous data streams from remote sites are commonly used in scientific and commercial applications. Correspondingly, there is increasing demand of assuring the integrity and authenticity of received data streams. Existing strategies of assuring data integrity and authenticity mainly use message authentication codes (MAC) generated on data blocks and transfer the MAC to the receiver for authentication through either out of band communication or in band communication. Transferring the MAC via out of band communication inevitably introduces communication overhead and additional complexity to synchronize the out of band communication with the data communication. Transferring the MAC via in band channel can be achieved by either appending the MAC to the original data or embedding the MAC into the original data, which would either incur communication overhead or change the original data. It would be desirable to be able to authenticate the stream data without any communication overhead and changing the original data at the same time. To deal with data packet or block loss, many of existing stream data authentication schemes rely on hash chaining, the current usage of which results in uncertainty in authenticating the subsequent data blocks once the first data packet or block loss is detected.

What is needed is a novel application layer authentication strategy for a data stream that requires no change to the original data and causes no additional communication overhead. Additionally, there is a need to continue authenticating the rest of data stream even if some data loss has been detected.

BRIEF DESCRIPTION OF THE SEVERAL VIEWS OF THE DRAWINGS

FIG. 3 is a table that summarizes authentication results as per an aspect of an embodiment of the present invention.

DETAILED DESCRIPTION OF EMBODIMENTS

Figure 1:
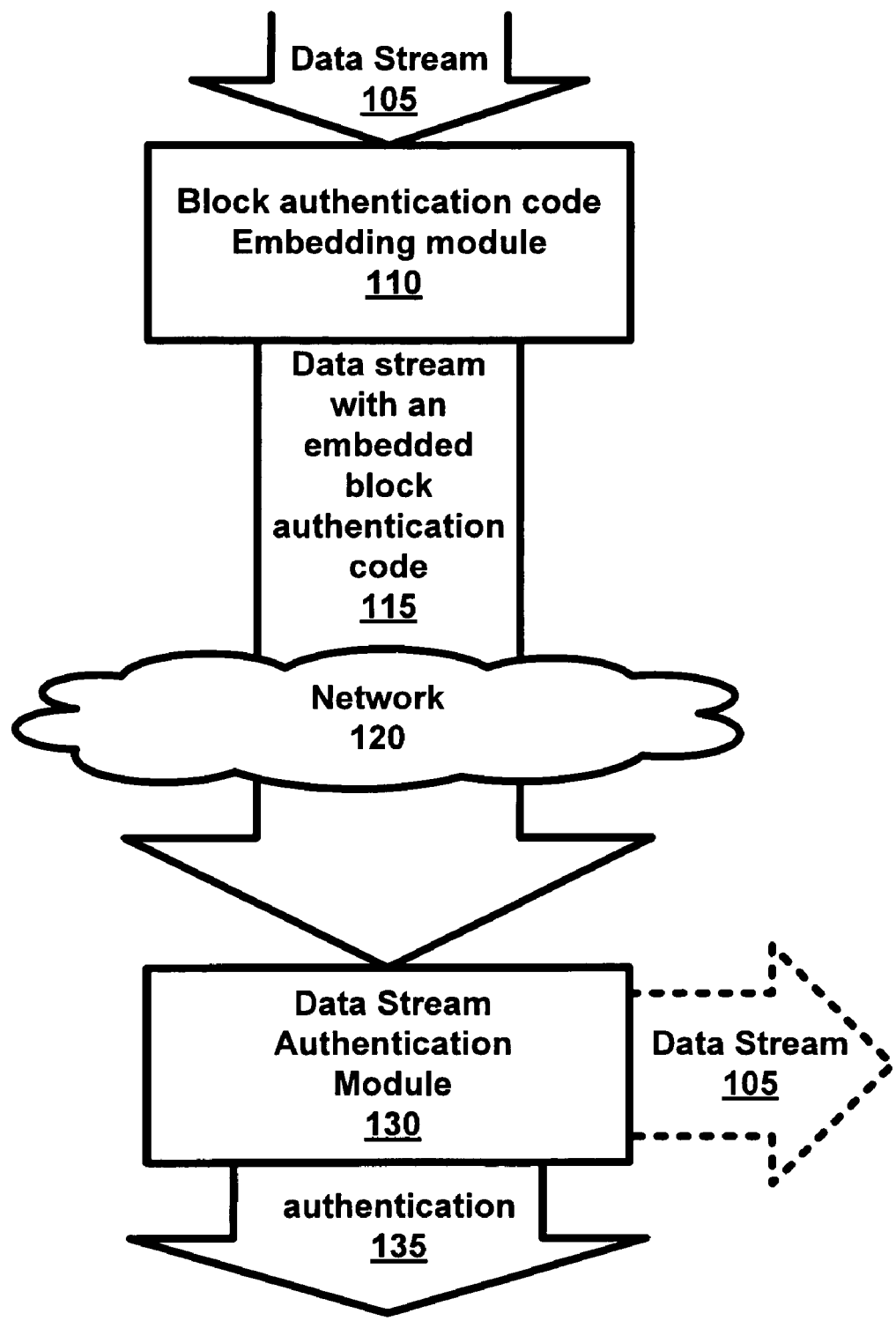
FIG. 1 is a system diagram of an aspect of an embodiment of the present invention.

The proliferation of the Internet has enabled more and more scientific and commercial applications to use continuous data streams sent from remote sites. For example, hurricane forecasting [1] demands continuous and timely data input from many public data archives (such as satellite images and oceanic changes from OAA [2]) to forecast the hurricane movement accurately. ADVFN [3] streams real-time stock prices, price data, and stock charts from the New York tock Exchange to subscribed users. Audio and video based media communications (e.g., teleconferencing, remote education, and entertainment) are becoming ubiquitous today in our everyday life [4]. In many such network applications, the data integrity and authenticity need to be assured. For example, the receivers of NOAA oceanic data want to make sure that the received data is genuine and has not been tampered with. Subscribers to the ADVFN real-time stock streaming services need to be certain that the received stock prices are from ADVFN and they have not been modified during the transmission. In addition to the capability to detect any unauthorized change over the transmitted content, the receivers of the continuous data stream want to be able to detect any packet loss during the transmission. In such applications, confidentiality may not be required as the data is meant to be public. Therefore, the continuous data stream may need to be authenticated without encryption.

Existing methods of assuring data integrity and authenticity use message authentication codes (MAC) generated through HMAC or NMAC or one-way hash functions on a block of data [5], [6], [7], [8], [9], [10], [11]. To transfer the MAC to the receiver for authentication, generally there are two approaches: via out of band or in band communication. Obviously transferring the MAC via out of band channel introduces additional communication overhead and computation complexity (i.e., synchronization between the out of band communication and the in band communication). To transfer the MAC via in band channel, the MAC can be either appended to or embedded into the original data. Embedding is to replace some bits in the original data that can eliminate the communication overhead. Thus, the in band communication for MAC either introduces additional overhead or changes the original data. It would be desirable to be able to authenticate the stream data without introducing any additional communication overhead nor changing the original data content.

To be able to detect any lost packet or data block, existing stream data authentication schemes mainly rely on hash chaining when generating the MAC. Most of these schemes [12], [13], [8] have no problem in detecting the first packet or block loss. But once the first block or packet loss is detected, it may result in uncertainty for them to continue authenticating the rest data stream. It would be desirable to be capable of detecting all packet or block loss and to continue the stream data authentication after detecting any packet or block loss.

Existing work on stream data and multicast authentication mainly uses message authentication codes (MACs) and secretkey cryptography. The trivial solution is to generate a MAC per packet and send with the packet together. Various approaches [13], [14] are proposed to lower the communication overhead by amortizing the authentication signature (MAC) where a single digital signature is used for the authentication of multiple packets. Gennaro and Rohatgi [13] presented a scheme that uses signature amortization over a hash chain. In [14], a Merkle hash tree is used to amortize a signature over multiple packets.

Another line of work [6], [9], [11], [15] was addressing the packet loss problem. In [11], a MAC is appended to every packet and the key of the MAC is provided in some subsequent packet. To tolerate packet losses, the keys are generated by the means of a hash chain. In [6], a directed acyclic graph is constructed and the hash of a packet is repetitively embedded into multiple packets so that packet loss can be tolerated. Recently, Pannetrat and Molva [9] proposed to deal with packet loss using Erasure codes. Authentication can be performed as long as a certain number of packets are received. Karlof et al. [16] proposed distillation codes to cope with packet loss and packet pollution.

Authentication of multimedia and images has also been studied [17], [18], along the direction to protect the copyright or the ownership of multimedia objects [19], [20]. For the MPEG movie, Hartung and Girod proposed an approach [21] that leverages the DCT transformation procedure. Lu et al. [7] proposed to combine the content authentication and ownership authentication.

Nevertheless, all existing strategies either embed information to the original content, or use out-of-band channels for authentication information communication, neither of which is required in presently disclosed embodiments, where covert channel [22] is leveraged to convey information. In addition, the hash chaining used in embodiments of the present invention avoid the authentication uncertainty upon data packet/block loss detection that exists in many existing schemes.

Presently disclosed embodiments are different from IPsec [23], [24], [25] in that they focuses on authenticating the application layer streaming data, rather than providing the data integrity and/or source authenticity at the IP layer.

Basic embodiments.

Throughout this disclosure, embodiments of the present invention are periodically referred to as DaTA which stands for "DaTA Transparent Authentication.

In DaTA, the authentication unit is a data block and the authentication code is generated using the content of the data block, thus called Block Authentication Code, abbreviated as BAC. FIG. 1 shows a basic high level diagram of an embodiment of DaTA. At the sender side, the authentication information—BAC—may be generated for blocks in a data stream 105 based on a selected hash function with the packet content and a commonly agreed key as the input. Based on the value of each bit ('0' or '1') of BAC, some packets may be scheduled to be sent out with additional delays by a BAC embedding module into the stream data 110. The data stream 105 now has block authentication codes embedded into the data stream 115. This BAC embedded data stream 115 may be sent to a receiver that may reside on the other side of a network 120. At the receiver side, a data stream authentication module 130 may extract the embedded BAC based on the relative packet delays and compares the extracted BAC with the BAC generated based on the received content for authentication 135. Aspects of the embodiments may include BAC generation, BAC embedding/BAC extraction, and BAC authentication. In this section, details of these components will be described, after which the packet boundary recognition issue is discussed with regard to packet loss, packet fragmentation, and out-of-order delivery.

The following notations are used: 1) The stream packets are clustered to blocks, denoted as block[i], with b packets in each block, where $$0 < i < \left\lceil \frac{total\_packet\_number}{b} \right\rceil.$$

Padding may be used when necessary to generate the last block; 2) The length (in terms of bits) of the BAC for each data block is n; 3) A hash function, denoted as H(X), may be a one-way hash, using an algorithm such as MD5 [26] or SHA [27]; 4) X,Y represents the concatenation of X with Y; 5) A secret key, k, may be only known to the communicating parties; and 6) The origin of the data stream may be identified by a flag, which is f bits and only known to the communicating parties, where $0 \leq f \leq n$.

BAC Generation

Figure 2:
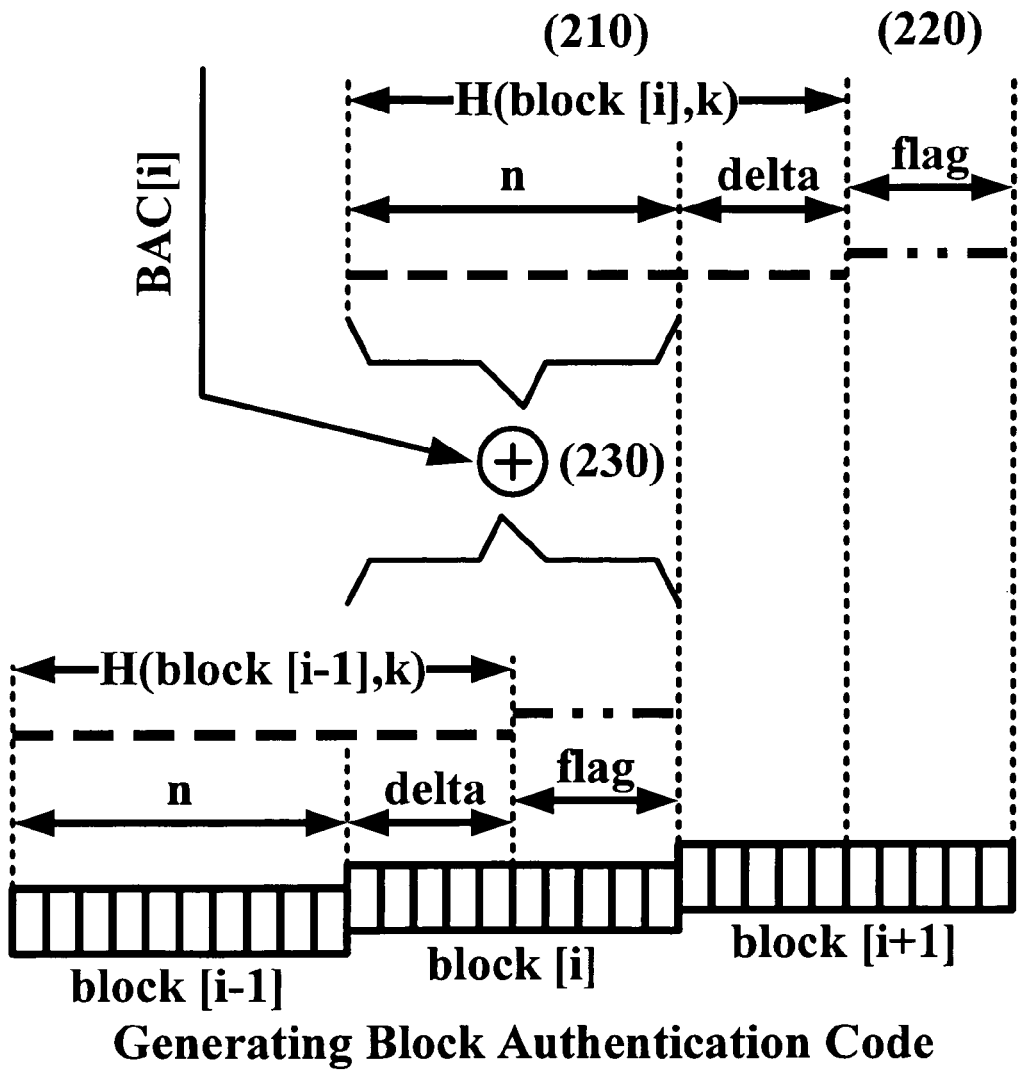
FIG. 2 is a diagram illustrating the generation of a block authentication code as per an aspect of an embodiment of the present invention.

FIG. 2 sketches the BAC generation procedure. As indicated in this figure, the BAC generation for data block i involves three steps: 1) The concatenation of data block i and the secret key k is used as input to hash function H to generate a binary string of n+δ bits as (210) in FIG. 2, where δ=n−f (This string is called the first-digest); 2) The source flag, denoted as f, is concatenated to the first-digest generated in the previous step, shown as (220) in FIG. 2, to get a binary string of 2n bits (This string is called the second-digest); and 3) The first n bits of the second-digest is XORed with the last n bits of the block i−1's second-digest, which is generated following the same procedure. The result, BAC[i], is the final BAC for data block I, which may be embedded. This step is shown as (230) in FIG. 2.

Note that for the first data block, a special second-digest (an Initial Vector—IV) may need to be agreed on by the communicating parties. In this BAC generation algorithm, if the value of δ is varied while keeping the δ+f=n, one may have different strategies.

δ=0: when δ is 0, the strategy becomes easy and straightforward. There is no chain at all. It only demands a fixed sized buffer, of b packets, at the sender side and the receiver side. The strategy can detect packet alteration or addition and can locate changes in the granularity of a block. However, it may not be able to detect block deletion and block (burst packet) loss, which may be very important in some stream based applications, such as streaming media delivery, since streaming media data delivery normally runs on UDP.

δ=n: when δ is n, the strategy may not be able to authenticate the source (unless the new BAC is XORed with f). With more bits (2n) in the authentication code, this strategy may reduce the collision rate since the number of bits in the hash result is larger. However, it may have a problem due to chaining. For example, if the verification of the current data block indicates that the current block is changed, it may mean the hash value of the current block cannot be used to authenticate the next block. Thus, the authentication of the next block and all its subsequent blocks may be uncertain. In addition, the protocol may not be able to distinguish the change of a data block and the deletion (or loss) of a data block.

The choices of δ and f have the tradeoff between authenticating the source and chaining to determine if the preceding block is lost. In most of existing hash chain based strategies, δ is n, or the hash function takes the two consecutive blocks as the input. This may cause their authentication deficiency. Thus, an appropriate δ should satisfy 0<δ<n.

BAC Embedding and Extraction

Once the BAC has been generated, it may need to be transferred to the receiver of the streaming data so that the streaming data can be authenticated. Unlike most existing streaming data authentication approaches, which either transfer the authentication code via out of band communication or embed the authentication code into the original data content, DaTA leverages the approach used in [28] to embed the BAC into the inter-packet timing. (Please note that the BAC to be embedded is very different from the watermark in [28], and the authentication based on BAC is completely new.) Shown here is how to embed and extract one bit of the BAC. Embedding and extracting multiple bits can easily be achieved by repeating the following process.

Assume the streaming data flow has m packets $P_1; : : : ; P_m$ with time stamps $t_1; : : : ; t_m$, respectively. To embed one bit, first, independently and randomly choose 2r (r>0 is the redundancy used for embedding the bit) distinct packets: $P_{z1}; : : : ; P_{z2r}(1 \leq z_k \leq m-1)$, and create 2r packet pairs: $\langle P_{zk}, P_{zk+1}\rangle(d \geq 1, k=1, \ldots, 2r)$.

Considering the 2r IPDs (Inter-Packet Delay) between $P_{zk+1}, P_{zk}$ $$ipd_{zk} = t_{zk+1} - t_{zk}, (k=1, \ldots, 2r). \quad (1)$$

Randomly divide the 2r IPDs into 2 distinct groups of equal size, and make sure that each IPD has equal probability to be in group 1 and group 2. $ipd_{1,k}$ and $ipd_{2,k}$ (k=1, ..., r) may be used to represent the IPDs in group 1 and group 2 respectively. Since each IPD has equal probability to be in group 1 and group 2, IPDs in group 1 and group 2 should be symmetric. Therefore, $E(ipd_{1,k})=E(ipd_{2,k})$, and $Var(ipd_{1,k})=Var(ipd_{2,k})$ $$\text{Let } Y_k = \frac{ipd_{1k} - ipd_{2,k}}{2}(k=1, \ldots, r).$$

$$\text{And } \overline{Y}_r = \frac{1}{r}\sum_{k=1}^{r} Y_k = \frac{1}{2r}\left[\sum_{k=1}^{r} ipd_{1,k} - \sum_{k=1}^{r} ipd_{2,k}\right]$$

Here $\overline{Y}_r$ is the average of r normalized IPD differences. Since all the 2r randomly selected IPDs are equal-probable to be in group 1 and group 2, $$\sum_{k=1}^{r} ipd_{1,k} \text{ and } \sum_{k=1}^{r} ipd_{2,k}$$

should have the same distribution and mean. Therefore $\overline{Y}_r$ is symmetric, and has zero mean. In other word, $\overline{Y}_r$ has equal probability to be positive and negative.

A '1' bit may be embedded by increasing $\overline{Y}_r$ by a >0 so that its probability to be positive will be greater than 0.5. Similarly, a '0' bit may be embedded by decreasing $\overline{Y}_r$ by a>0 so that its probability to be negative will be greater than 0.5. To increase or decrease $\overline{Y}_r$ by a, one can simply increase or decrease each of the r $Y_k$'s by a. To increase $Y_k$ by a, one can increase $ipd_{1,k}$ by a and decrease $ipd_{2,k}$ by a. Similarly, one can decrease $Y_k$ by a by decreasing $ipd_{1,k}$ by a and increasing $ipd_{2,k}$ by a.

Apparently, the embedding is probabilistic in that there is a small chance that the bit will not be successfully embedded. As shown in [28], the embedding successful rate can be made arbitrarily close to 100% with sufficiently large redundancy r.

Assuming that the receiver shares the secret of which packets are used for encoding and decoding the BAC, $\overline{Y}_r$ at the receiver side from the timestamps of the received packets may be calculated. To extract an embedded bit, one may check the value of $\overline{Y}_r$. If it is greater than 1, the embedded bit may be decoded as '1', otherwise, the embedded bit may be decoded as '0'.

It is true that decoding a particular bit could be wrong due to the probabilistic nature of encoding and network delay jitter. However, analysis in [28] has shown that the correct decoding rate can be made arbitrarily close to 100% with sufficiently large redundancy despite of network delay jitter.

Authentication

With the extracted BAC bits and received data packets, the receiver may apply the same hash function (H) on the received data packets with the same secret key (k) to generate the content based BAC following the same procedure used for BAC generation at the sender side. Then the extracted BAC may be compared with the content based BAC.

The comparisons may consist of two parts: the first part is on the first δ bits, while the second is on the rest f=(n−δ) bits. Considering the possible scenarios, the table in FIG. 3 briefly summarizes the authentication result.

Note that in some of the embodiments, every received data block may be authenticable independently, which is based on the f bits matching in the BAC comparisons. Check this part first; the first δ bits can indicate whether the preceding data block is deleted or lost. Thus, in case 1, the extracted and generated BACs are completely matched, the current data block is authenticated to be genuine. In case 2, the second part authentication failure indicates that the current data block is changed; although the first part authentication succeeds, one may not be able to conclude the preceding block is genuine. In case 3, the success of the second part authentication indicates the current block is genuine. Therefore, the first part authentication failure indicates that the preceding data block has been changed/deleted. Theoretically, there is false positive if the change of the current block does not alter the second part. But the probability is very small. In case 4, the authentication failure on both parts strongly suggests that the current data block is changed. The status of the preceding block is uncertain.

Considering the situations of the preceding data block authentication, DaTA can distinguish the deletion/loss from alteration. For example, given two consecutively received data blocks, if the second part of the preceding data block authentication is successful, while the first part of the current block authentication fails and the second part succeeds, some data blocks between these two are lost/deleted.

Through the above analysis, DaTA exhibits the following features: (1) it can detect tampering, including content alteration and packet/block deletion; (2) it is able to locate the change to the data block level so that in some circumstances, the application can make decisions (e.g. retransmission) accordingly; (3) it is capable of ensuring that each block is authenticable even if any preceding data block is found to be changed. In another word, it is not a fragile scheme. Besides authenticating the content itself, the scheme is also able to authenticate the content source. This is due to the splitting of the authentication into two parts, where the second part authenticates both content and the content source.

Block Boundary Recognition

It may be important that the receiver can correctly delimit packets into an appropriate data block. If a packet is mistakenly delineated at the receiver side, both the BACs extracted from the packet arrival IPDs and generated based on the received packets may not be consistent with the sender side. This may make authentication impossible. Since packet loss may cause trouble with block boundary recognition, it will be discussed now.

To enable the receiver to delineate the data block boundary at the sender side, the last packet of the previous data block and the first packet of the current data block should be specially utilized. In one embodiment, the BAC bit is embedded by slightly adjusting the packet delivery time, so if a sufficient large delay is intentionally added between these two packets (but still in the allowable range), the delay may serve the boundary delineating purpose.

In some embodiments, the normal inter-packet delay adjustment may be limited by a, where a is the adjustment size. Thus, if one finds the maximum inter-packet delay in the data stream (through a technique such as online profiling), and add an extra a, this number should be sufficient to be used as a block boundary delimiter if there are no network fluctuations. In practice, some extra space can be added to allow for network fluctuations. Thus, 2a was evaluated in experiments.

Packet loss is not uncommon in streaming based communications, particularly when the streaming runs on UDP. Although existing research [29] and measurement [30] find that packet loss is less than 0.1% on the Internet backbone, some of the embodiments may be sensitive to that since the loss of a packet not only damages the current data block, but may also cause a change in the block boundary and result in incorrect BAC extraction.

A simple method for DaTA to deal with packet loss is to examine both the number of packets and the artificial block boundary delay. At the receiver side, whenever an artificial block boundary delay is found, the receiver may consider that a block is completely received and the next packet belongs to the next block. If the received packet number is less than b, clearly, some packets are lost. Regarding the packet boundary, a particular concern comes from the effect of additional delay on the application's performance in the proposed scheme. Since the additional delay introduced by some of the embodiments is in the granularity of several milliseconds, it could hardly affect the application's performance. In addition, it is common that at the sender and receiver sides, applications use buffers to buffer some transmitted data before they are used. For example, for Internet video streaming, normally there is always a few second initial buffer. Taking these facts into consideration, the additional delay introduced for boundary recognition by our proposed scheme can be easily absorbed by the application buffer.

Two other factors that may raise concerns are the packet fragmentation and out-of-order delivery. Since the packet fragmentation rate is very low today [31], it is not considered the problem caused by the normal packet fragmentation. For out-of-order delivery, it is observed that only about 0.3% packets arrive out of order [32].

Figure 4:
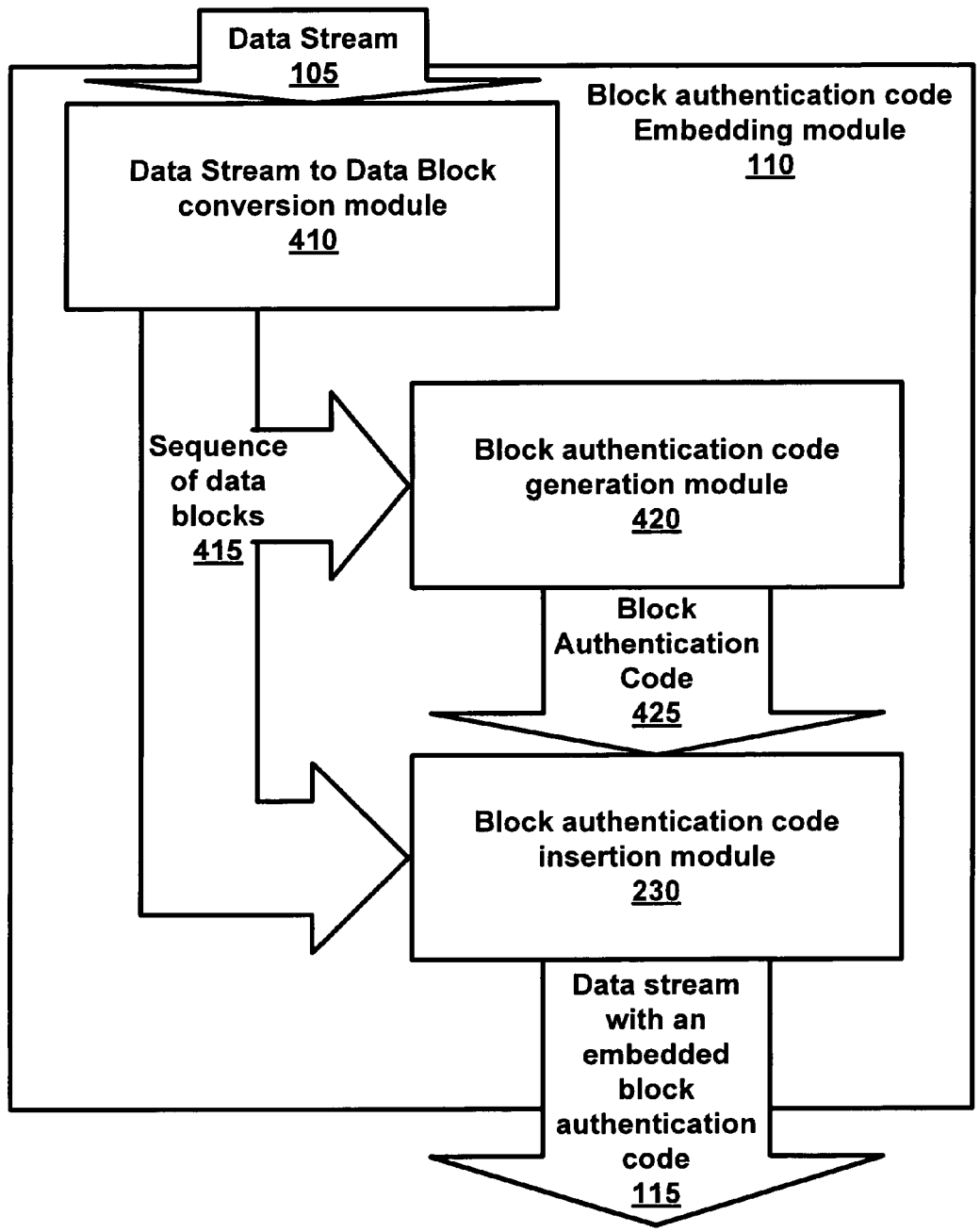
FIG. 4 is a diagram of a block authentication code embedding module as per an aspect of an embodiment of the present invention.

A specific set of potential and illustrative embodiments will now be disclosed. FIG. 4 is a diagram of a block authentication code embedding module 110 as per an aspect of an embodiment of the present invention. This module may be built as a system. The block authentication code embedding module 110 is configured to embed a block authentication code into a stream data 105 and may include: a data stream to data block conversion module 410, a block authentication code generation module 420; and a block authentication code insertion module 230.

Figure 5:
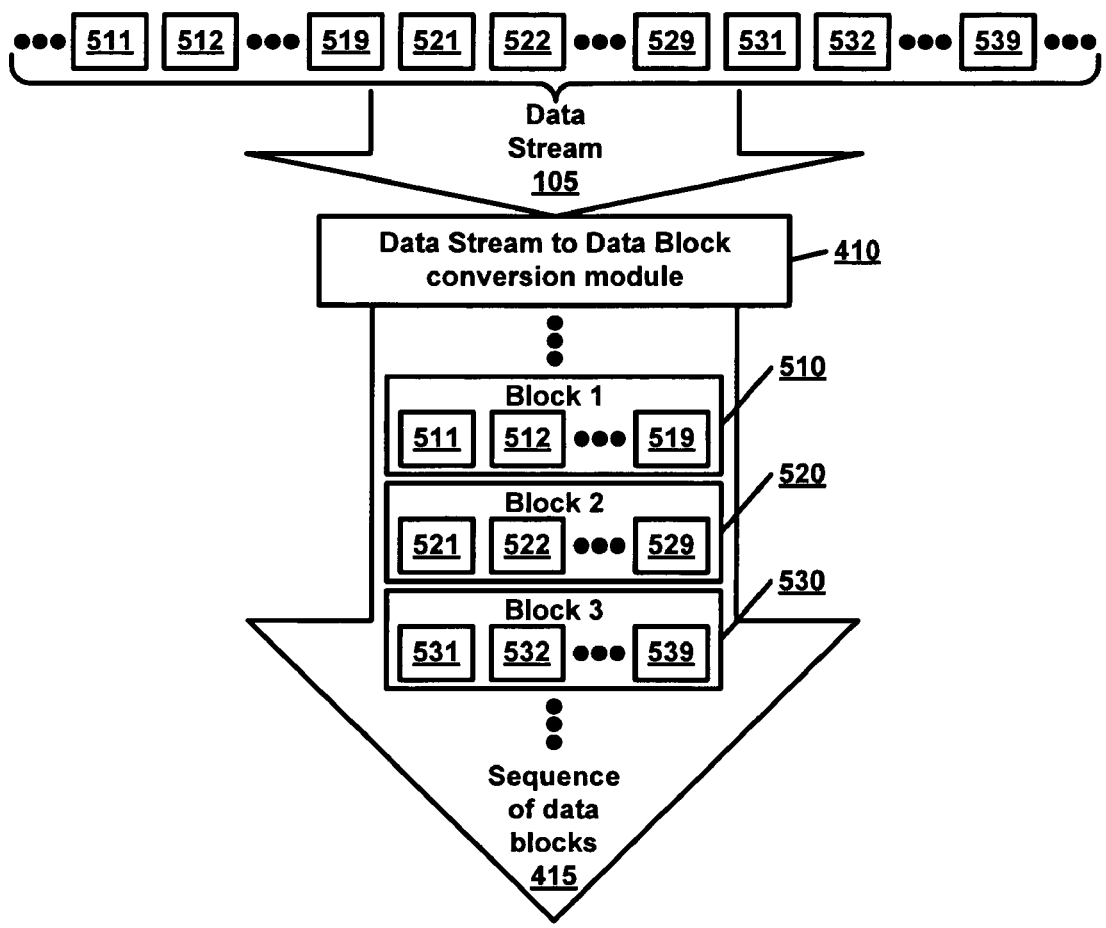
FIG. 5 is a diagram illustrating the conversion of a data stream into a sequence of data blocks as per an aspect of an embodiment of the present invention.

FIG. 5 is a diagram illustrating the conversion of a data stream 105 into a sequence of data blocks 415 by the data stream to data block conversion module 410. The data stream 105 includes a series of individual packets are represented in FIG. 5 by 511, 512, 519, 521, 522, 529, 531, 532 and 539. The data stream to data block conversion module 410 is configured to divide the data stream 105 into a sequence of data blocks 415. The sequence of data blocks 415 includes: a first data block 510; a second data block 520 being the block immediately after the first data block 510; and a third data block 530 being the block immediately after the second data block 520. As shown: packets 511, and 512 through 519 are included in block 1 510; packets 521, and 522 through 529 are included in block 1 520; and packets 531, and 532 through 539 are included in block 1 530.

Figure 6:
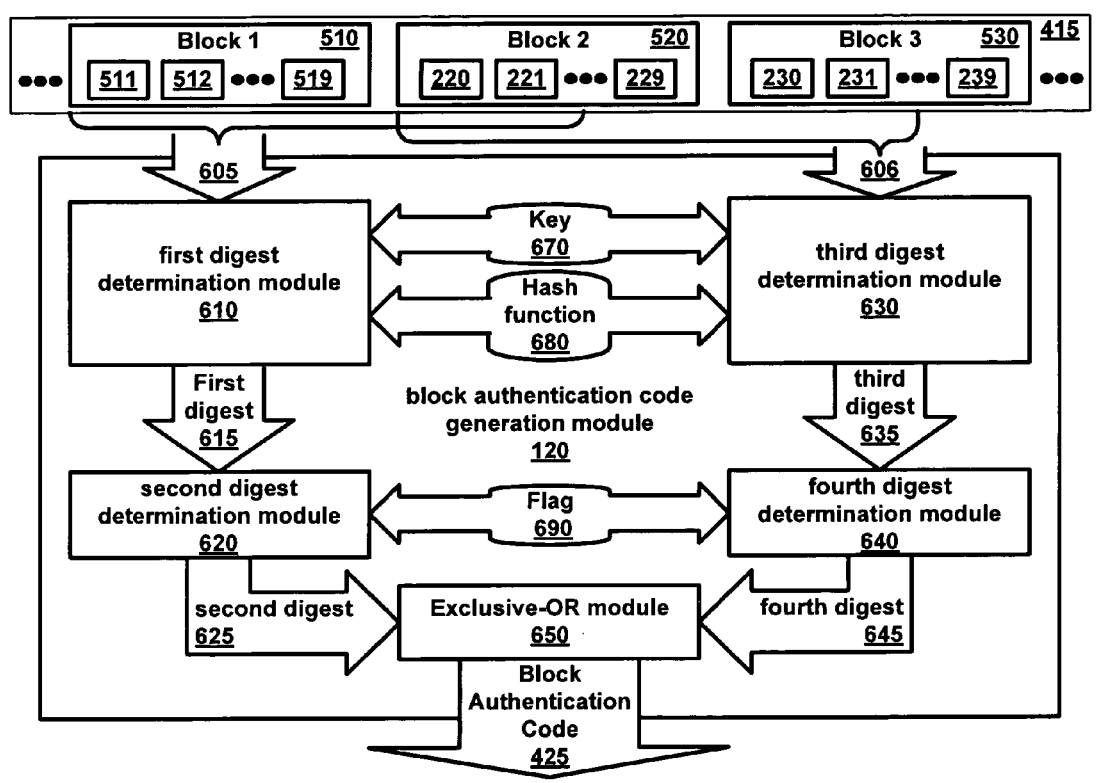
FIG. 6 is a diagram of a block authentication code generation module as per an aspect of an embodiment of the present invention.

FIG. 6 is a diagram of the block authentication code generation module 120. The block authentication code generation module 120 may be configured to generate a block authentication code 425 for the second data block 520. The block authentication code 425 may be generated using: a first digest determination module 610; a second digest determination module 620; a third digest determination module 630; a fourth digest determination module 640; and an exclusive-OR module 650. The first digest determination module 610 may be configured to determine a first digest 615 using: the first data block 510 and part of the second data block 520 (shown together as 605); a key 670; and a hash function 680. The hash function 680 may be any well-defined procedure or mathematical function for turning data into a relatively small value. Examples of hash functions include: a SHA-1 hash function; an MD5 hash function; elf64; HAVAL; RIPEMD; SHA256; Tiger; and Whirlpool. The key 670 key may be a piece of information that may be used in determining the functional output of the hash function 680. The second digest determination module 620 may be configured to determine a second digest 625 by concatenating the first digest 615 and a flag 690. The flag may be a series of bits to delineate the origin or end of the digest data. The third digest determination module 630 may be configured to determine a third digest using: the second data block 520 and part of the third data block (shown together as 606), the key 670 and the hash function 680. The fourth digest determination module 640 may be configured to determine a fourth digest 645 by concatenating the third digest 635 and the flag 690. The exclusive-OR module 650 may be configured to determine an n-bit sized block authentication code 425 by taking an exclusive OR of the last n bits of the second digest 625 and the first n bits of the fourth digest 645.

Figure 7:
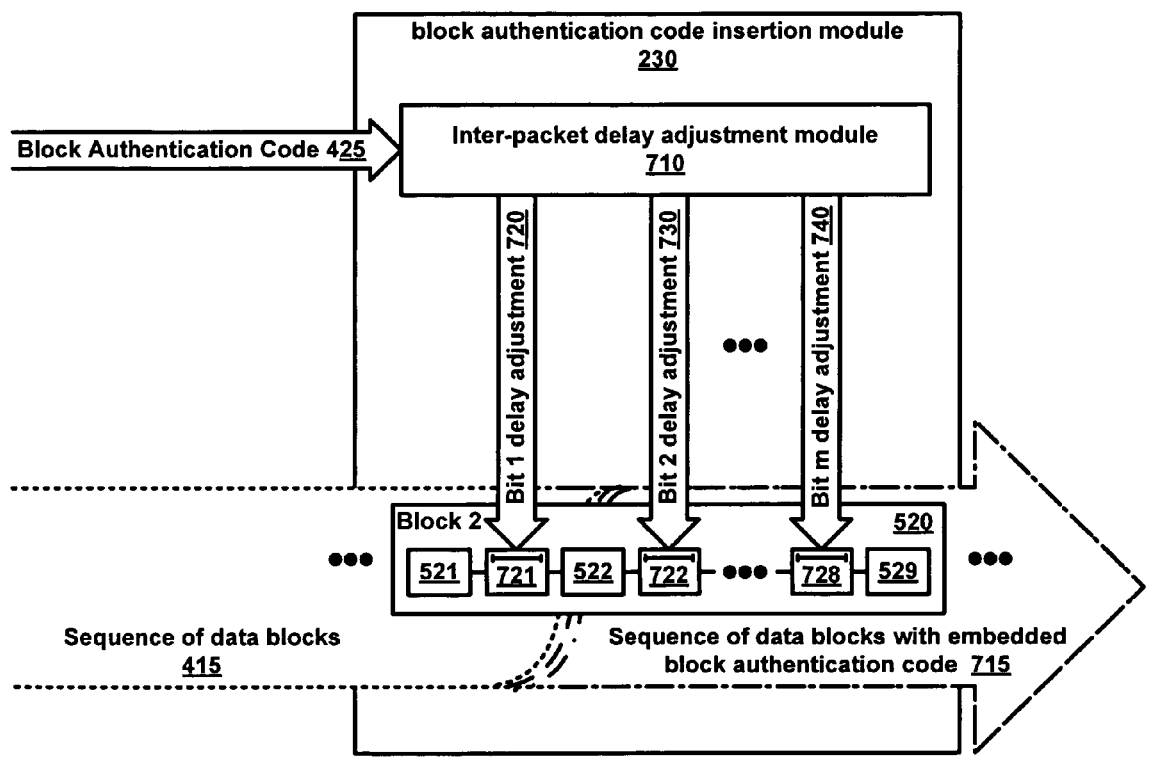
FIG. 7 is a diagram of a block authentication code insertion module as per an aspect of an embodiment of the present invention.

FIG. 7 is a diagram of a block authentication code insertion module 230. As shown, the block authentication code insertion module 230 is configured to embed block authentication code(s) 425 into the sequence of data blocks 415, thus creating a sequence of data blocks with embedded block authentication codes(s) 715. The block authentication code 425 into the timing of the second data block 520 by adjusting inter-packet delays (721, 722 . . . 728) between packets (521, 522 . . . 529) in the second data block 520. The inter-packet delays (721, 722 . . . 728) may be implemented using an inter-packet delay adjustment module 710 that controls the individual delay adjustments (720, 730 . . . 740). The timing adjustments may be defined in many different ways to represent the block 425. For example, a '1' may be represented by increasing the inter-packet timing delay and a '0' may be represented by decreasing the inter-packet timing delay, or vice versa.

As shown, the block authentication code(s) 425 are embedded into the sequence of data blocks 415, one data block at a time. Specifically, a block authentication code 425 is embedded in each second data block 520. To make this work, the labeled second data block 520 changes to the next sequential block each time a block authentication code 425 is embedded into one of the sequence of data blocks 415. To do this, the block immediately after the third data block 530 may be labeled as a fourth data block. The second data block 520 may now become the first data block 510, the third data block 530 may now become the second data block 520 and the fourth data block may now become the third data block 530. At this point the system (or module depending on the embodiment) may operate on the new first data block 510, second data block 520 and third data block 530.

To increase the accuracy of the block authentication code 425 recovery, the block authentication code 425 may be made redundant. In general this may create a series of performance trade-offs, (such as block size, bandwidth, throughput, accuracy, etc), some of which have already been discussed.

Figure 8:
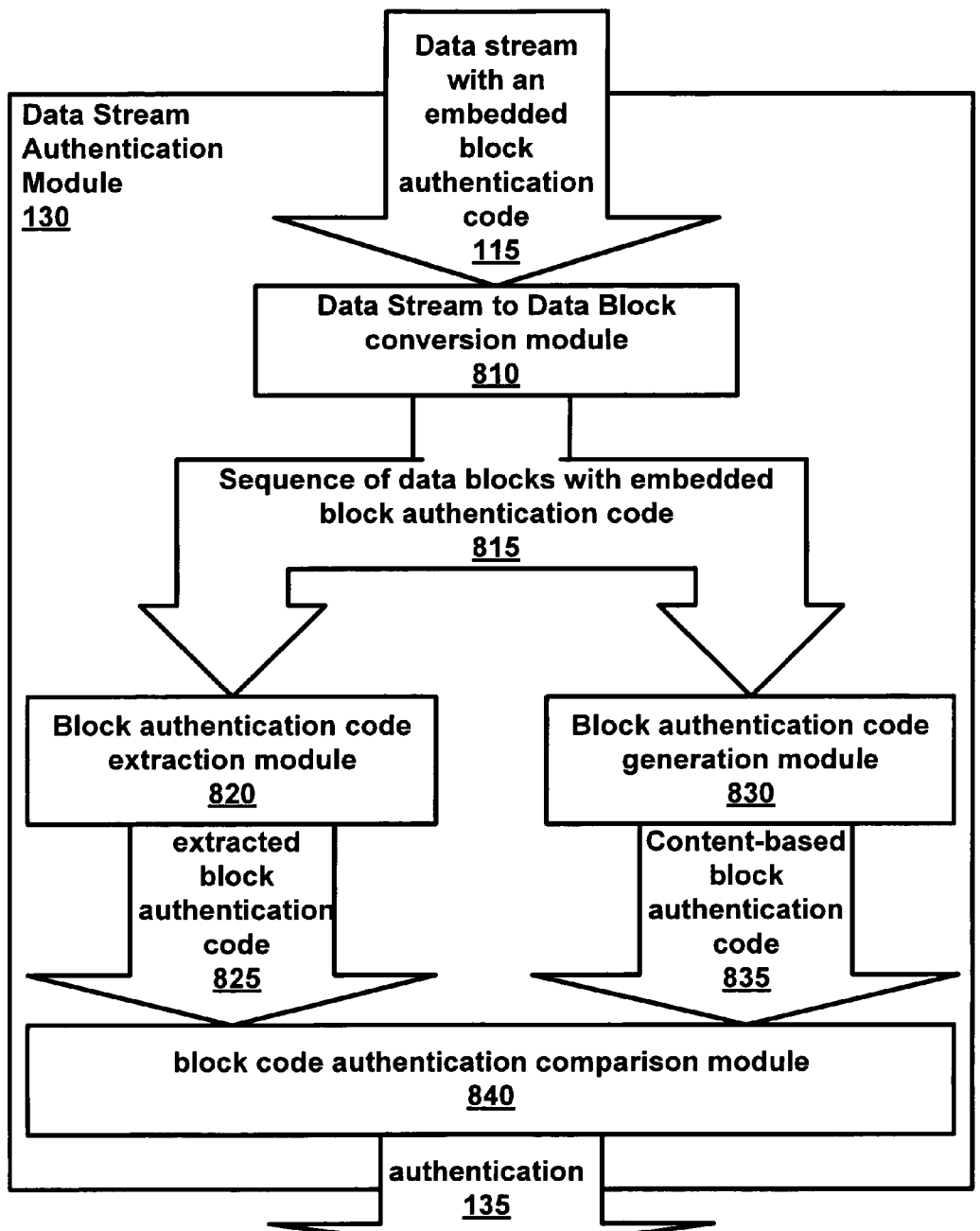
FIG. 8 is a diagram of a data stream authentication module as per an aspect of an embodiment of the present invention.

FIG. 8 is a diagram of a data stream authentication module 130. As shown in this illustrative example, the data stream authentication module 130 includes a data stream to data block conversion module 810, a block authentication code extraction module 820, a block authentication code generation module 830, and a block code authentication comparison module 840.

The data stream to data block conversion module 810 may be similar to data stream to data block conversion module 410, with one difference being that this device is configured to operate on a data stream where the data blocks have been pre-delineated. Data stream to data block conversion module 810 may be configured to divide a received data stream having an embedded block authentication code 115 into a sequence of data blocks 815. The sequence of data blocks 815 may be separated by an inter-block delay to delineate between the data blocks within the sequence of data blocks 815. The sequence of data blocks 815 may include: a first data block 510; a second data block 520 immediately after the first data block 510 and a third data block 530 immediately after the second data block 520.

Figure 9:
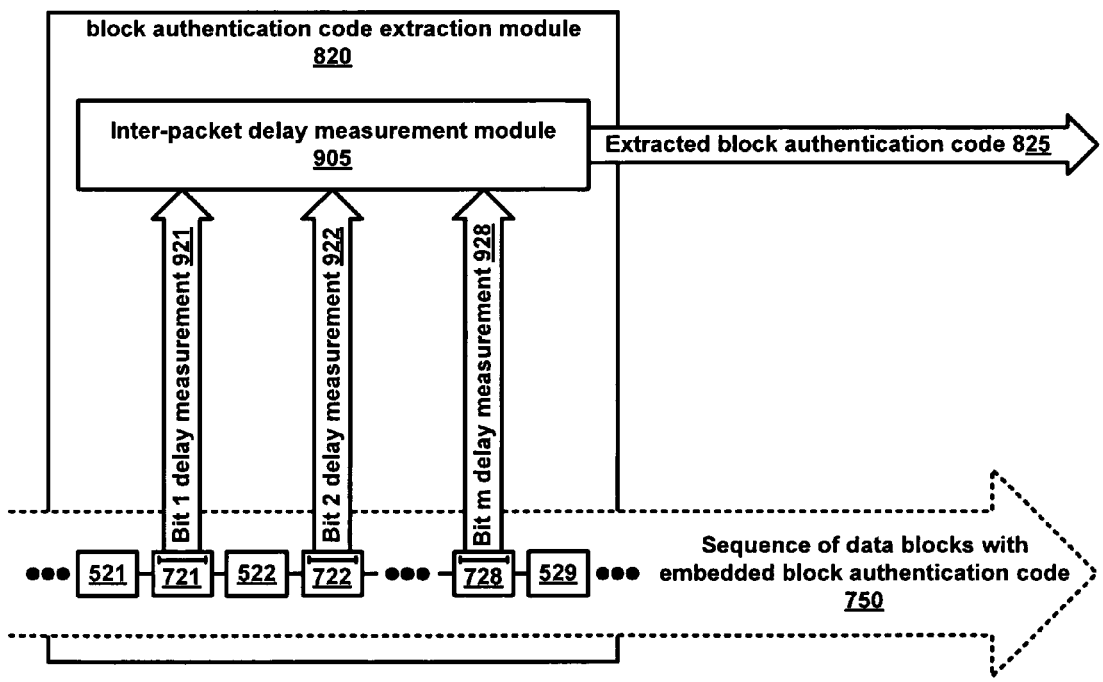
FIG. 9 is a diagram of a block authentication code extraction module as per an aspect of an embodiment of the present invention.

An illustrative diagram of the block authentication code extraction module 820 is shown in FIG. 9. The block authentication code extraction module 820 may be configured to extract an extracted block authentication code 825 from the second data block 520 in a sequence of data blocks with an embedded authentication code 750 by measuring inter-packet delays (921, 922 . . . 928) between the packets in the second data block 520. These inter-packet delay measurements may be made by an inter-packet delay measurement module 905.

The block authentication code generation module 830 may be configured to generate a content-based block authentication code 835 for the second data block 520. This module may operate similarly to the block authentication code generation module 120. This block authentication code generation module 830 may also include: a first digest determination module; a second digest determination module; a third digest determination module; a fourth digest determination module; and an exclusive-OR module. The first digest determination module may be configured to determine a first digest using: the first data block 510 and part of the second data block 520 (shown together as 605); a key 670; and a hash function 680. This hash function 680 and key 670 should be the same hash function 680 and key 670 used to embed the block authentication code 425. The second digest determination module may be configured to determine a second digest by concatenating the first digest and a flag. The flag should also be the same as the flag used when embedding the embed the block authentication code 425 into data stream 115. The third digest determination module may be configured to determine a third digest using: the second data block and part of the third data block (shown together as 606), the key and the hash function. The fourth digest determination module may be configured to determine a fourth digest by concatenating the third digest and the flag. The exclusive-OR module 650 may be configured to determine an n-bit sized block authentication code 425 by taking an exclusive OR of the last n bits of the second digest and the first n bits of the fourth digest 645.

Figure 10:
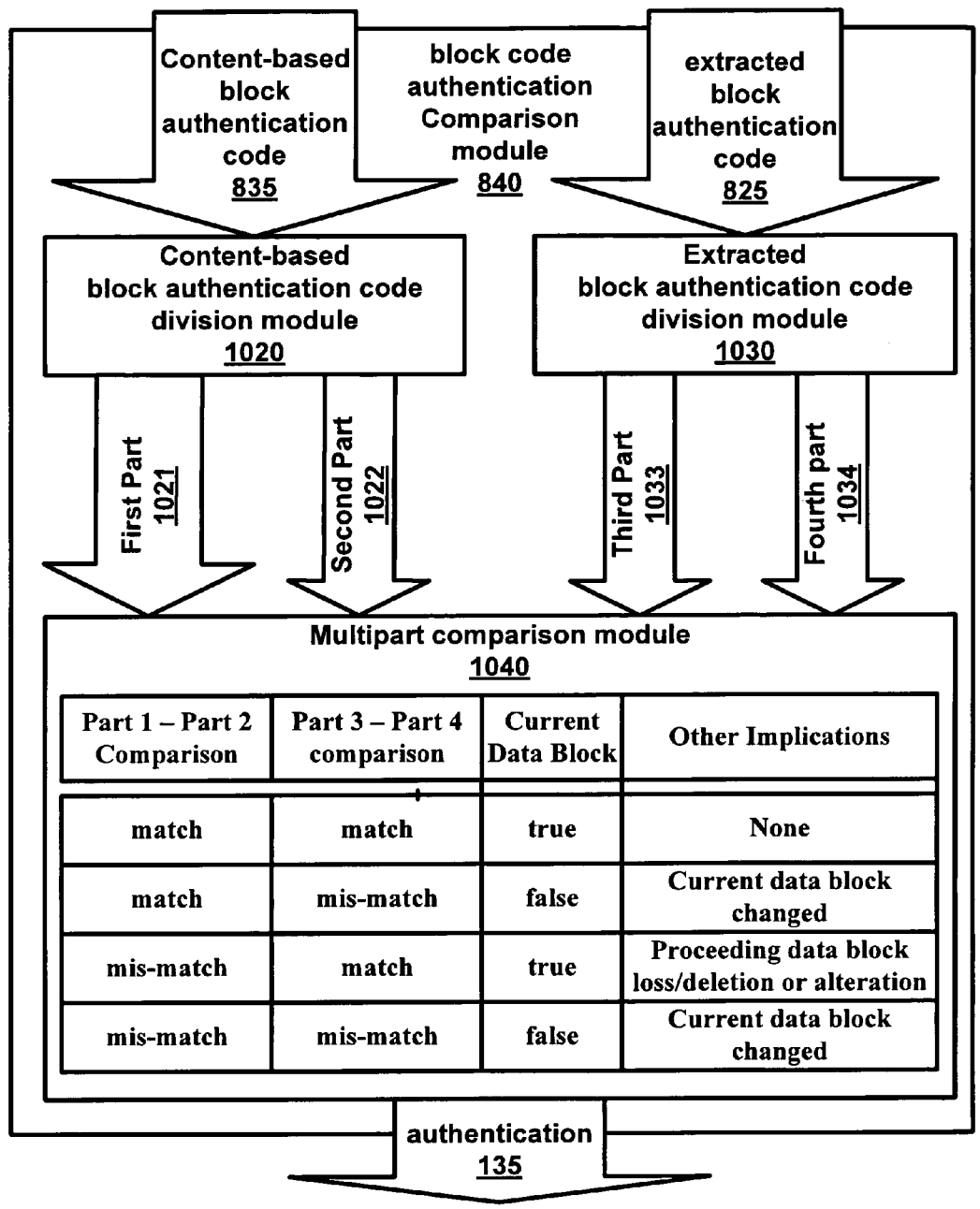
FIG. 10 is a diagram of a block code authentication comparison module as per an aspect of an embodiment of the present invention.

The block code authentication comparison module 840 is shown in FIG. 10. A shown, the block code authentication comparison module 840 is configured to compare the content-based block authentication code 835 with the extracted block authentication code 825. The block code authentication comparison module 840 may include: a content-based block authentication code division module 1020, an extracted block authentication code division module 1030 and a multipart comparison module 1040. The content-based block authentication code division module 1020 may be configured to divide the content-based block authentication code 835 into a first part 1021 and a second part 1022. The first part may include the first (n−f) bits of the content-based block authentication code 835 and the second part 1022 may include the last f bits of the content-based block authentication code 835. The extracted block authentication code division module 1030 may be configured to divide the extracted block authentication code 825 into a third part 1033 and a fourth part 1034.

The third part 1033 may include including the first (n–f) bits of the extracted block authentication code 825 and the fourth part being the last f bits of the extracted block authentication code 825.

The block code authentication comparison module 1040 may include a multipart comparison module 1040 to analyze the first part 1021, the second part 1022, the third part 1033 and the fourth part 1034 to determine if the content-based block authentication code 835 and the extracted block authentication code 825 match. This module may be implemented using numerous mechanisms including using a lookup table, or logical formulations or some combination thereof. In this illustrative example, block code authentication comparison module 1040 may report on of the following conditions in multipart comparison module 1040: (1) that the content of the second data block 520 has not changed if the second part 1022 and the fourth part match 1034; (2) that the content of the second data block 520 has not changed if the first part 1021 and the third part match 1033 and the second part 1022 and the fourth part match 1034; (3) that the first data block 510 was not lost if the first part 1021 and the third part match 1033 and the second part 1022 and the fourth part match 1034; (4) that the second data block 520 has changed if the first part 1021 and the third part match 1033 and the second part 1022 and the fourth part 1034 do not match; (5) that the first data block 510 was lost, deleted or altered if the first part 1021 and the third part 1033 do not match and the second part 1022 and the fourth part 1034 match; and (6) that the second data block 520 has changed if the first part 1021 and the third part 1033 do not match and the second part 1022 and the fourth part 1034 do not match.

As discussed before, the block authentication code(s) 425 are embedded into the sequence of data blocks 415, one data block at a time. Specifically, a block authentication code 425 is embedded in each second data block 520. To make the authentication work continuo sly, the labeled second data block 520 may change to the next sequential block each time a block authentication code comparison is performed. To do this, the block immediately after the third data block 530 may be labeled as a fourth data block. The second data block 520 may now become the first data block 510, the third data block 530 may now become the second data block 520 and the fourth data block may now become the third data block 530. At this point the system (or module depending on the embodiment) may operate on the new first data block 510, second data block 520 and third data block 530.

Figure 11:
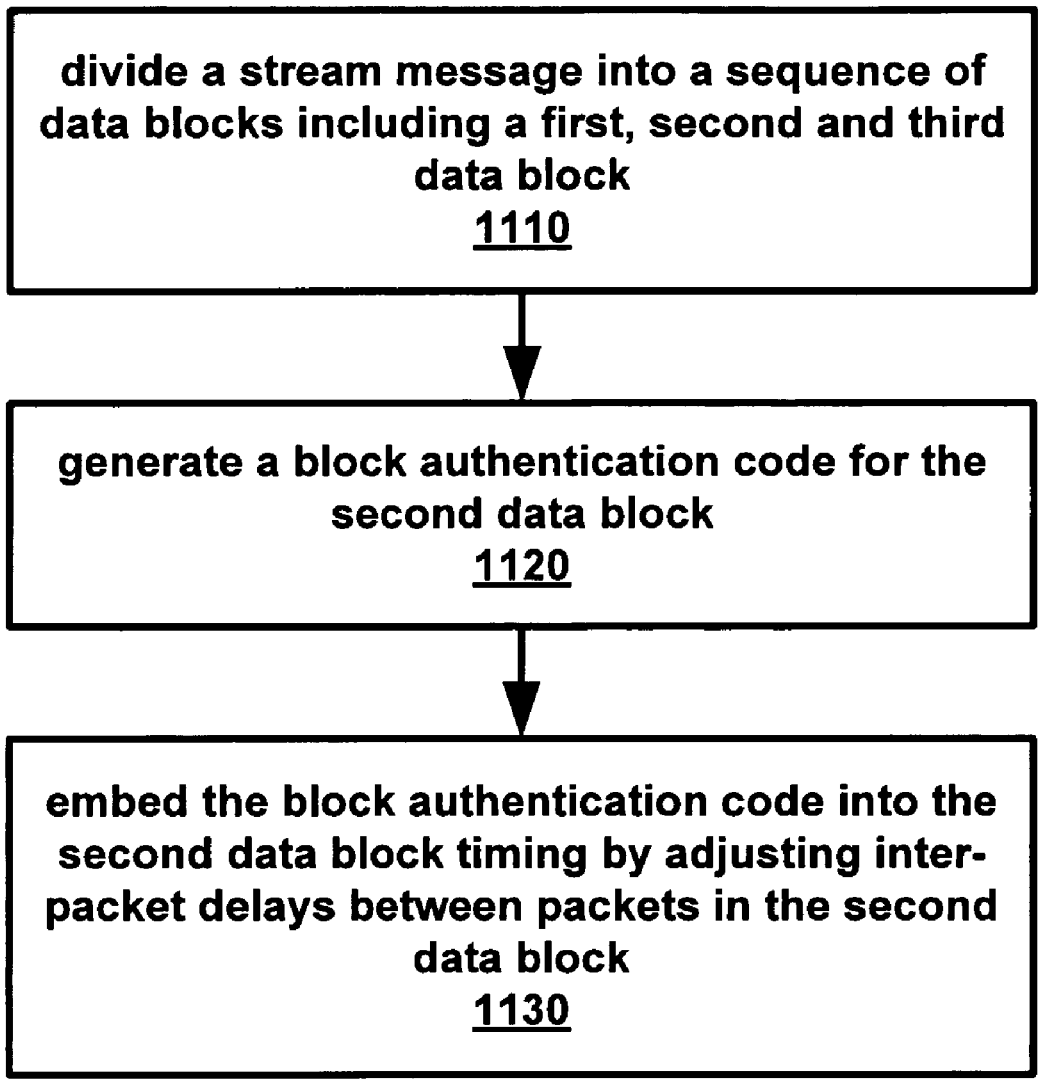
FIG. 11 is a flow diagram showing block authentication code embedding as per an aspect of an embodiment of the present invention.

Some embodiments of the present invention may be a computer-readable media tangibly embodying a program of instructions executable by a computer to perform a method for embedding a block authentication code into stream data. FIG. 11 is a flow diagram showing block authentication code embedding as per an aspect of such an embodiment. As illustrated, a stream message may be divided into a sequence of data blocks at 1110. The sequence of data blocks may include a first data block, a second data block being the block immediately after the first data block and a third data block being the block immediately after the second data block. At 1120, a block authentication code may be generated for the second data block. At 1130, the block authentication code may be embedding into the timing of the second data block by adjusting inter-packet delays between packets in the second data block.

Figure 12:
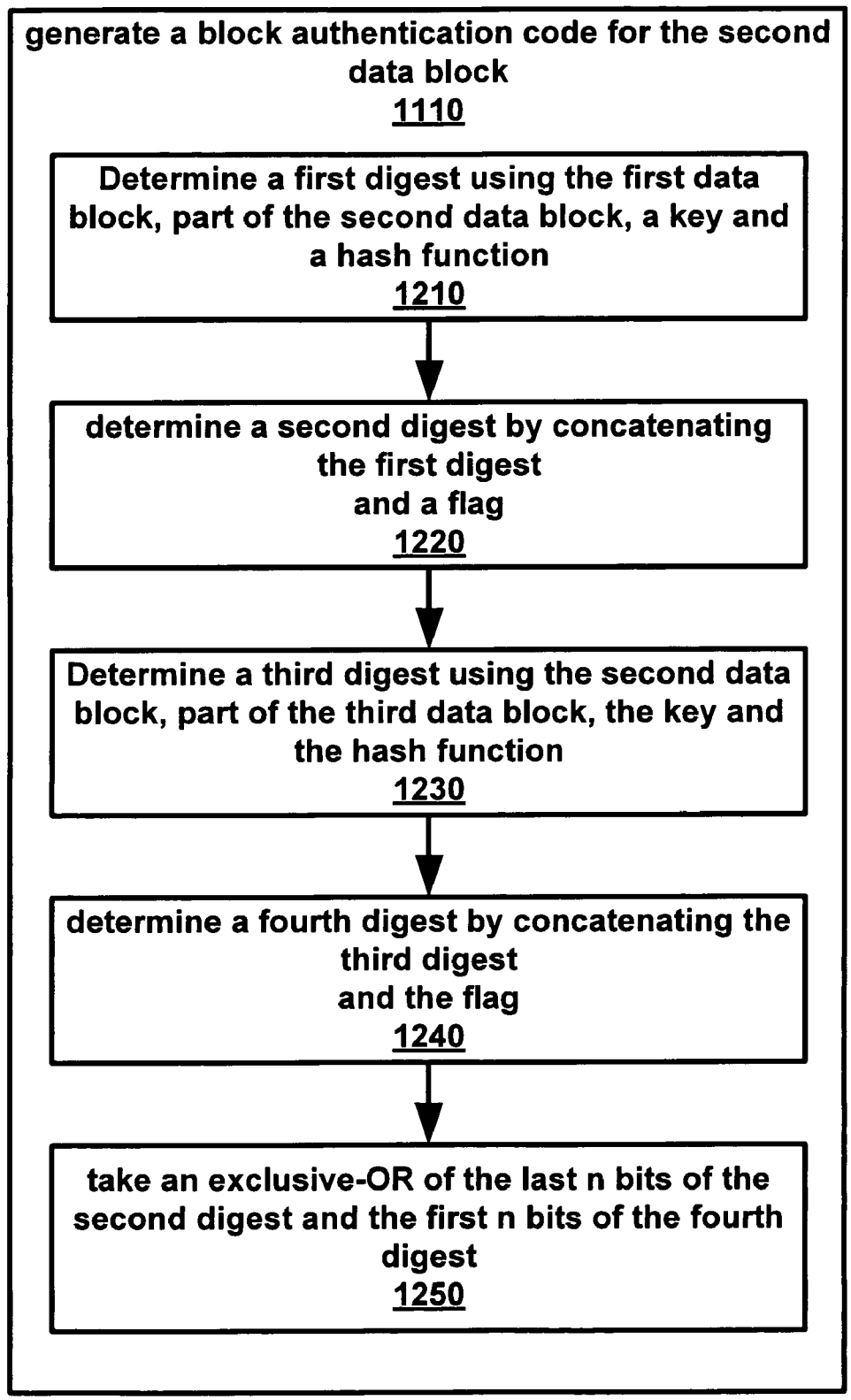
FIG. 12 is a flow diagram showing the generation of a block authentication code as per an aspect of an embodiment of the present invention.

FIG. 12 is a flow diagram that expands on action 1110 and shows a possible actions to generate a block authentication code having n bits for the second data block. At 1210, a first digest may be determined using: the first data block; part of the second data block; a key; and a hash function. A second digest may be determined at 1220 by concatenating: the first digest; and a flag. At 1230, a third digest may be determined using: the second data block; part of the third data block; the key; and the hash function. A fourth digest may be determined at 1240 by concatenating: the third digest; and the flag. At 1250 the block authentication code may be completed by taking an exclusive OR of: the last n bits of the second digest; and the first n bits of the fourth digest. The hash function, key and flag here may be functionally equivalent to the hash function, key and flag described in earlier embodiments.

To process a continuous data stream, after each block authentication code is determined, the block immediately after the third data block may be defined as a fourth data block. Then, the second data block can become the first data block, the third data block can become the second data block; the fourth data block can become the third data block; and the actions just described may be repeated. Also, many of the techniques described earlier may also be applied here. For example, the block authentication code may be formed as a redundant block authentication code. An additional example includes embedding a '1' into the timing of the second data block by increasing at least one of the inter-packet delays and embedding a '0' into the timing of the second data block by decreasing at least one of the inter-packet delays.

Figure 13:
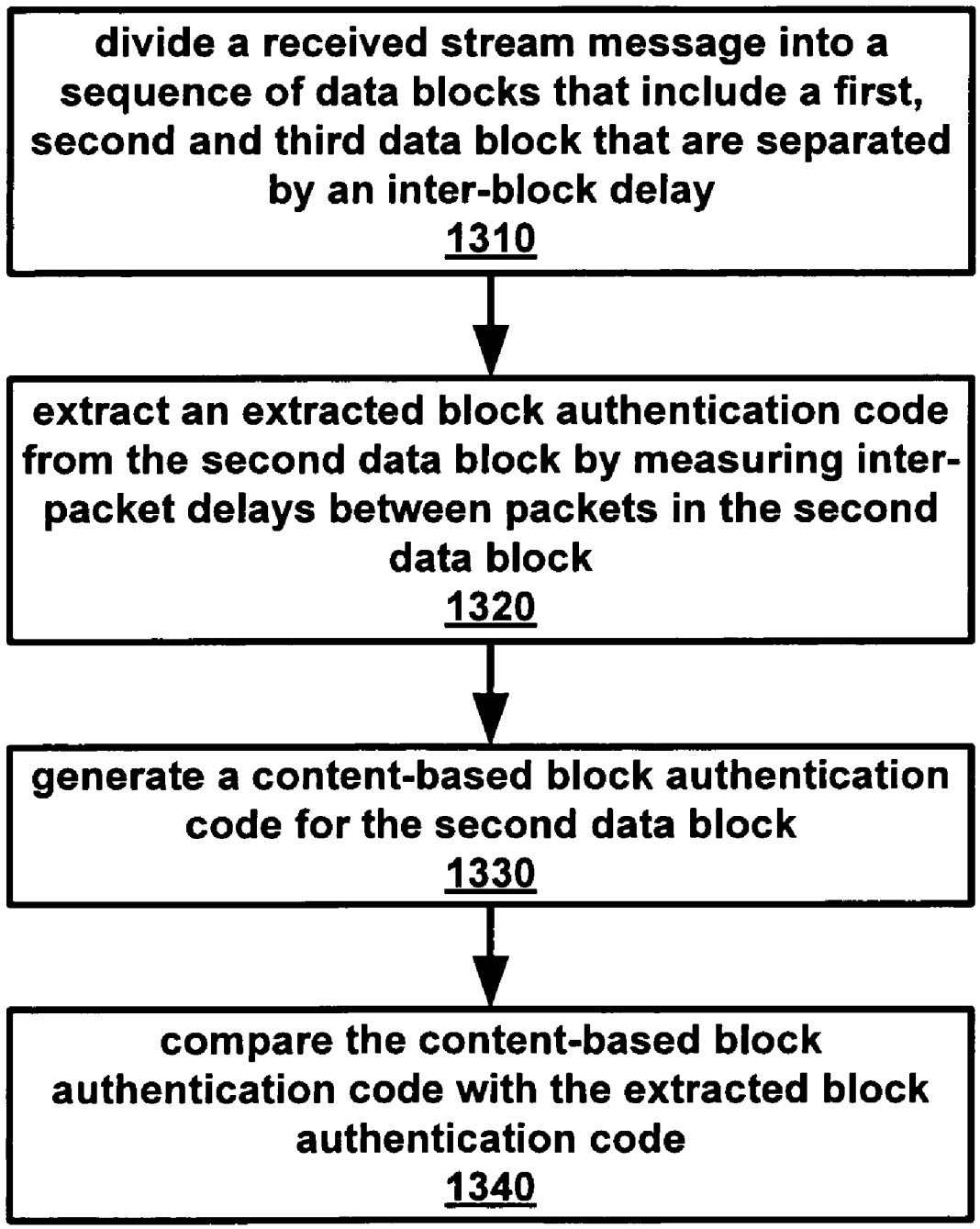
FIG. 13 is a flow diagram showing the authentication of a data stream as per an aspect of an embodiment of the present invention.

FIG. 13 is a flow diagram illustrating one of many ways that a data stream that has a block authentication code embedded in it may be authenticated. These illustrated actions may be implemented as a computer-readable media tangibly embodying a program of instructions executable by a computer. A received data stream may be divided into sequence of data blocks at 1310. The sequence of data blocks may be separated by an inter-block delay and may include: a first data block; a second data block being the block immediately after the first data block; and a third data block being the block immediately after the second data block. At 1320, an extracted block authentication code may be extracted from the second data block by measuring inter-packet delays between packets in the second data block. A content-based block authentication code may be generated for the second data block at 1330 using actions that are functionally equivalent to the actions just described in FIG. 12. At 1340, the content-based block authentication code my be compared with the extracted block authentication code. To do this, the content-based block authentication code may be divided into a first part and a second part, with the first part may include the first (n–f) bits of the determined block authentication code and the second part may include the last f bits of the determined block authentication code. Similarly, the extracted block authentication code may be divided into a third part and a fourth part, with the third part including the first (n–j) bits of the extracted block authentication code, the second part being the last f bits of the extracted block authentication code. These parts may then be analyzed to learn about the data blocks. For example, one can learn that: (1) the content of the second data block has not changed if: the second part and the fourth part match; (2) that the content of the second data block has not changed if: the first part and the third part match and the second part and the fourth part match; (3) that the first data block was not lost if: the first part and the third part match and the second part and the fourth part match; (4) that the second data block has changed if: the first part and the third part match and the second part and the fourth part do not match; (5) that the first data block was lost, deleted or altered if: the first part and the third part do not match and the second part and the fourth part match; (6) that the second data block has changed if: and the first part and the third part do not match and the second part and the fourth part do not match.

DaTA Analysis

In DaTA, the authentication information is generated based on the content of the data block, which is called content BAC. The BAC embedded to (or extracted from) the inter-packet timing is called the reference (or extracted) BAC. At the receiver side, when the receiver receives the stream flow, the reference BAC extracted from the inter-packet timing may be used as a reference for the content BAC calculated from the packet content.

Let $C=b_1, \ldots, b_n$ be the original content BAC and the original reference BAC (they are always equal), $C_{1=b_{1,1}}, \ldots, b_{1,n}$ be the reference BAC of the received stream flow, and $C_{2=b_{2,1}}, \ldots, b_{2,n}$ be the content BAC of the received streaming flow. In ideal case, $C_1=C_2=C$. In real world, both $C_1$ and $C_2$ could deviate from C due to reasons such as packet loss, content change or network delay jitter. The goal is to determine whether $C_2$ equals to C. However, the receiver of the streaming flow does not know C and he/she only knows $C_1$ and $C_2$. Therefore, the receiver has to use $C_1$ and $C_2$ to determine whether $C_2$ equals to C.

After getting $C_1$ and $C_2$ from the received streaming flow, the receiver uses the following rules to determine whether $C_2$ equals to C:

$$\begin{cases} C_2 = C & \text{if } C_1 = C_2, \\ C_2 \neq C & \text{if } C_1 \neq C_2. \end{cases} \quad (4)$$

Here $C_1$ may be used as the reference for checking the value of $C_2$. Since $C_1$ could be different from C, it is possible that 1) $C_2$ is falsely determined to be equal to C; or 2) $C_2$ is falsely determined to be different from C.

The first case may be regarded as a false positive, and the later case as a false negative. The false positive rate and the false negative rate can be quantitatively represented as $Pr[C_1=C_2|C_2\neq C]$ and $Pr[C_1\neq C_2|C_2=C]$ respectively.

Assume the probability that any particular bit in $C_1$ and $C_2$ is different from the corresponding bit in C is independent from each other. Let $Pr[b_{1,i}=b_i]=p_1$ and $Pr[b_{2,i}=b_i]=p_2$, where $1\leq i\leq n$. The false negative rate is thus $$\begin{aligned}
Pr[C_1 \neq C_2 \mid C_2 = C] &= 1 - Pr[C_1 = C_2 \mid C_2 = C] \quad (5)\\
&= 1 - \frac{Pr[C_1 = C \wedge C_2 = C]}{Pr[C_2 = C]}\\
&= 1 - Pr[C_1 = C]\\
&= 1 - p_1^n
\end{aligned}$$

Let $X_k$ be the probability that both $C_1$ and $C_2$ (where $C_1=C_2$) have exactly the same $0\leq k\leq n$ bits different from C, and let $Y_k$ be the probability such that $C_2$ have exactly $0\leq k\leq n$ bits different from C, then $$X_k = \binom{n}{k} p_1^{n-k}(1-p_1)^k \times p_2^{n-k}(1-p_2)^k$$

and $$Y_k = \binom{n}{k} p_2^{n-k}(1-p_2)^k$$

when $0<p_1\leq 1$; $0<p_2<1$, $$\begin{aligned}
\text{the false positive rate is} &= \frac{Pr[C_1 = C_2 \mid C_2 \neq C]}{Pr[C_2 \neq C]} \quad (6)\\
&= \frac{Pr[C_1 \neq C \wedge C_2 \neq C \wedge C_1 = C_2]}{Pr[C_2 \neq C]}\\
&= \frac{\sum_{k=1}^{n} X_k}{\sum_{k=1}^{n} Y_k}\\
&= \frac{\sum_{n=1}^{n}\binom{n}{k}p_1^{n-k}(1-p_1)^k \times p_2^{n-k}(1-p_2)^k}{\sum_{k=1}^{n}\binom{n}{k}p_2^{n-k}(1-p_2)^k}\\
&= \frac{[p_1 p_2 + (1-p_2)]^n - p_1^n p_2^n}{1 - p_2^n}
\end{aligned}$$

Based on Equation 5, one can see that the larger $p_1$ is, the smaller the false negative rate. Equation 6 indicates that when $p_1$ approaches 1, the false positive rate approaches 0.

Therefore, it may be desirable to make the reference BAC as robust as possible so that both the false positive and false negative rates are small. This analysis result demonstrates the necessity of enhancing the robustness of the basic authentication strategy.

Given any fixed $p_1$ and $p_2$, larger n will decrease the false positive rate as implied in Equation 6. Besides the fact that the false positive rate decreases with the increase of n, there is always a maximum value for the false positive rate for different n as indicated in these figures.

Simply increasing the BAC length is not always possible. In the next section, some other optimizations for improving $p_1$ and reducing delay impact to the application's performance is disclosed.

Optimizations and Discussions

The analysis in the previous section shows that it may be necessary to increase the robustness of the reference BAC. The accuracy of the reference BAC could be affected by many factors, such as network jitter, packet loss, adjustment size, and BAC length. Thus, it may be necessary to optimize the basic design to make it practical. In this section, several issues and strategies are discussed for this purpose.

Redundancy Level

In an ideal environment, where there are no network fluctuations, embedding a BAC bit using two packet pairs (4 packets) is enough (redundancy level r=1). For example, to embed a 24-bit BAC, one would only need 96 packets if these packets are not repetitively used. A block size of 96 packets will make locating a changed packet easier. This provides convenience and reduces cost for a remedy: if the application decides to retransmit the tampered block, only 96 packets need to be re-transmitted.

However, due to network fluctuations, a redundancy level of 1 may make the embedded BAC error-prone since the BAC embedding in some of the embodiments is probability based. An occasional large jitter could delay one of the packets, resulting in an error of the corresponding embedded BAC bit, and decreases the authentication accuracy of the embodiment.

According to Equation 3, the larger the redundancy level r, the more centralized to 0 of the Yr distribution. In another word, the instance of Yr will be more likely to fall into $[-a;+a]$. Given a fixed adjustment size a, a large redundancy level leads to a higher authentication accuracy. Thus, to make some of the embodiments more robust, it may be desirable to increase the redundancy level.

But the higher the redundancy level, the more packets are needed in a data block. For example, if the redundancy level is increased to 20 for the 24-bit BAC, at least 1920 packets are needed. If any of these packets is lost or tampered with, 1920 packets have to be retransmitted. Thus, one should always use an appropriate redundancy level. This is further explored via experiments to be discussed.

Trade-off Between Redundancy Level and BAC Length

In the above, it was shown that an appropriate redundancy level should be determined when the block size can vary. Under this condition, the block size should be kept relatively small. In other situations, if a block size is limited or fixed, a new issue arises.

Given a fixed data block size, increasing the redundancy level will increase the robustness of the extracted BAC bits, thus increasing $p_1$ in the above equation. However, with a limited number of packets in the block, increasing the redundancy level also reduces the number of BAC bits that can be embedded. That is the BAC length. The BAC length determines the collision rate and the false positive rate of the scheme. Thus, a longer BAC length is almost always desired. Clearly, increasing the redundancy level and increasing the BAC length have conflicting interests and thus must be well balanced. That is to say, when the block size is determined, a trade-off between block size and BAC length exists, and an appropriate redundancy level should be used. This will be further evaluated.

Bidirectionally Embedding a Bit

So far to embed a BAC bit, one can always increase the IPD value of two packets. Intuitively, to embed a '1', one can always delay the first and the second packet of the first and second packet pair, respectively. That means those two packets are sent a later than their original scheduled delivery time, while the other two packets are sent as usual. To embed '0' bit, the second and the first packet of the first and second packet pairs may be sent with a delay. Based on the previous analysis, the larger the adjustment size a, the higher the accuracy. However, if a is large, it may adversely affect the performance of some real-time applications. For example, for online video data authentication, a very large delay of the packet may cause the packet to be dropped, or cause the client to experience playback jitter. Neither of these situations is pleasant.

To alleviate the delay effect, an optimization may be done as follows: to embed a '1' bit, one can send the first packet in the first pair $$\frac{a}{2}$$

later than its originally scheduled delivery time and the second packet $$\frac{a}{2}$$

earlier than its originally scheduled delivery time. For the second packet pair, the first packet may be delivered $$\frac{a}{2}$$

earlier while the second is delivered $$\frac{a}{2}$$

later. Similarly, one can embred a '0' bit.

This optimization may be constrained by buffer availability at the sender side and is thus advantageous only for some applications. If there is a non-zero-second buffer (such as encoding buffer) at the sender side, this optimization can be applied.

Performance Evaluation

To study the effectiveness of some embodiment of the present invention, a real-time Linux kernel based packet-level authentication prototype system was built. The system runs at the precision of 100 microseconds (the normal Linux system runs at the 10 milliseconds) and is capable of online embedding and extracting authentication information. Based on the prototype system, 5 sets of experiments in a local (and more controllable) network to study various aspects of our proposed scheme with artificially introduced network jitter and packet loss was conducted. The experimental results over the Internet are omitted due to page limit. Interested readers can refer to our technical report [33].

Experiment Setup

In local experiments, the workload used was a 160 second streaming video, which is encoded at 300 Kbps with a rate of 15 frames/second, with a total of 10299 packets.

The experimental platform consists of three machines. A Linux box of 2.4 GHz CPU with 1 GB memory running Fedoral Core 2 is used for Darwin Streaming server [34] or TCP Replayer, and a second Linux machine of CPU 2.4 GHz and 1 GB memory running our prototype system is set up as a router, where the BAC bits are added before the data is streamed to the destination machine, which runs Windows XP with 1.8 GHz CPU 1.8 and 512 MB memory.

To generate the content based BAC, MD5 with the payload of the data packets as the input was used. The output hash value consists of 128 bits, of which the first and the last 12 bits are cut off and concatenated as the BAC for that data block. In these experiments, the number of BAC bits was always 24 and the block length was 1000 if not explicitly noted. The packet distance was set as 1 and the distance between the selected packet pair (for embedding) was 2. With different redundancy levels, the required number of packets varies. For example, with a redundancy level of 6, a total of 576 packets was used for adjusting the inter packet delay, since one packet was used only once in a packet pair.

One particular important factor affecting some of the embodiments is network jitter. In local experiments, experiments were run when two types of jitter distribution (uniform and normal) were present. For each distribution, also tested was jitter with different probabilities to simulate the normal network jitter (1%) and the extreme case (100%). A jitter probability of 1% means among 100 packets only 1 packet is randomly selected to be delayed and this emulates the normal network. A 100% jitter probability is to emulate the network upon network congestion (and thus packet burst, or a spike), where all packets are delayed. The delay of selected packet is always limited by the maximum jitter value in each experiment.

Block Boundary Detection

In several of the embodiments, the correct block boundary detection may be the basis for authentication. The data block boundary is determined by examining and looking for the artificially introduced large inter-packet delays. A sufficiently large delay indicates that a boundary is met. With the dynamics of network fluctuations, it is possible that the network fluctuations may affect the correctness of the block boundary detection. In addition, a packet loss or deletion may introduce large interpacket delays.

Figure 14:
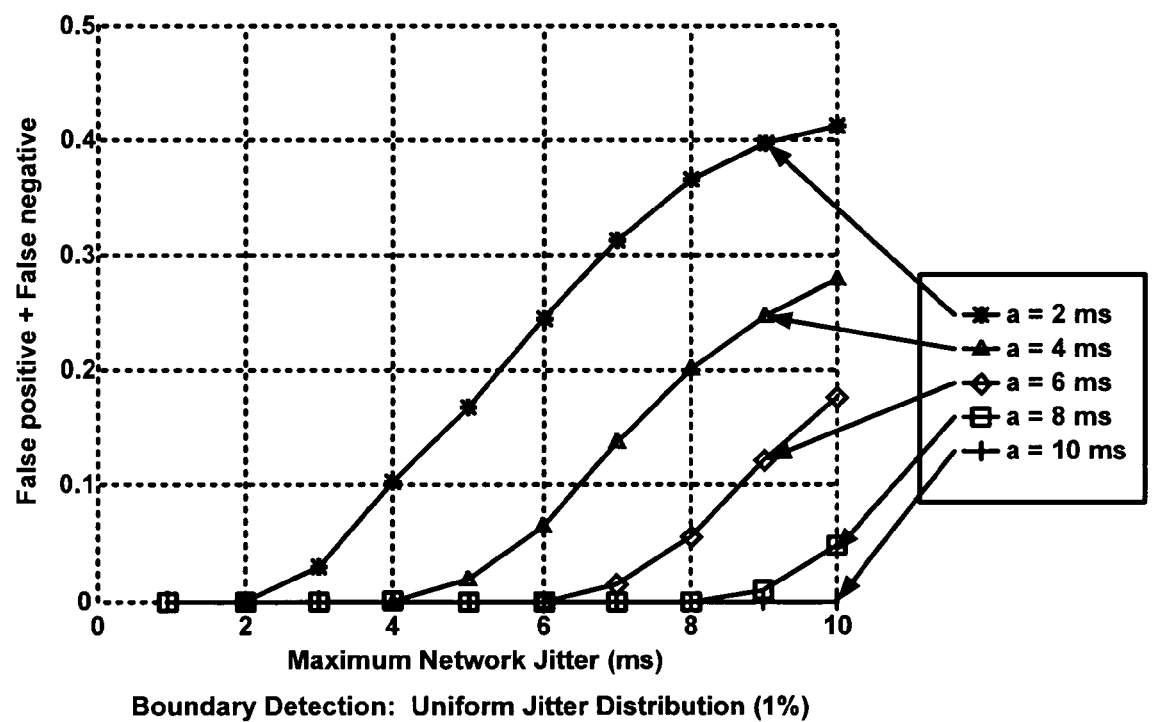
FIG. 14 is a graph showing boundary detection error rates when network fluctuations follow a uniform jitter distribution of 1% for a video stream using an aspect of an embodiment of the present invention.
Figure 15:
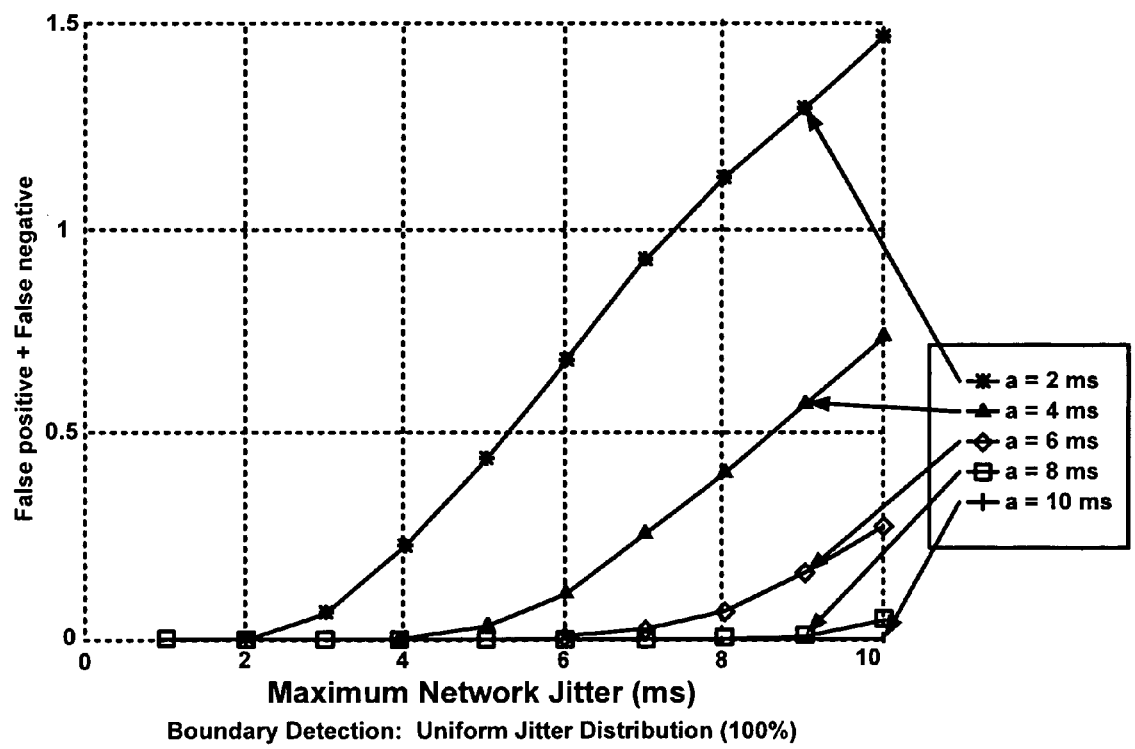
FIG. 15 is a graph showing boundary detection error rates when network fluctuations follow a uniform jitter distribution of 100% for a video stream using an aspect of an embodiment of the present invention.

First, in the experiments, the impact of network fluctuations was studied. In these experiments, the block size was set as 100 and have 103 data blocks in total. FIG. 14 and FIG. 15 show the boundary detection error rates when the network fluctuations follow a uniform distribution for the video stream. In the figures, x-axis represents the network jitter in ms, while y-axis denotes the sum of false positive and false negative (due to page limit). These are simply referred to as the error rate in the following context. False positive is defined as the error when a non-boundary is recognized as a boundary, while false negative means the error when a boundary is not recognized as boundary. Each experiment was repeated 100 times. Since the maximum inter-packet delay in the original packet flow was 69 ms, and the average was 15.221 ms, the adjustment size a was applied, from 1 to 10 ms and shown on the figures with all even values.

In FIG. 14 and FIG. 15, packet jitter occurs with probability 1% and 100%, respectively. As shown in both figures, given certain network jitter, the larger of the adjustment size, the smaller the error rate. If the maximum jitter is smaller than the adjustment size, the error rate is always 0 or close to 0 in both cases. Note in FIG. 15, the error rate is larger than 1 when the adjustment size is 2 ms and maximum jitter is larger than 7 ms. This is reasonable since when each packet is delayed and the jitter is much larger than the adjustment size, a boundary could be found between each packet pair. These results suggest that an adjustment size of 4 ms is good to consider average network jitter (less than 1 ms) as reported by [30]. Internet experiments further tested this.

Experiments have also been performed when the jitter follows a normal distribution with a mean value in the range of 2-8 ms. Compared to the uniform distribution, the jitter following a normal distribution has less impact on the correctness of boundary detection. The figures were omitted for brevity.

Figure 16:
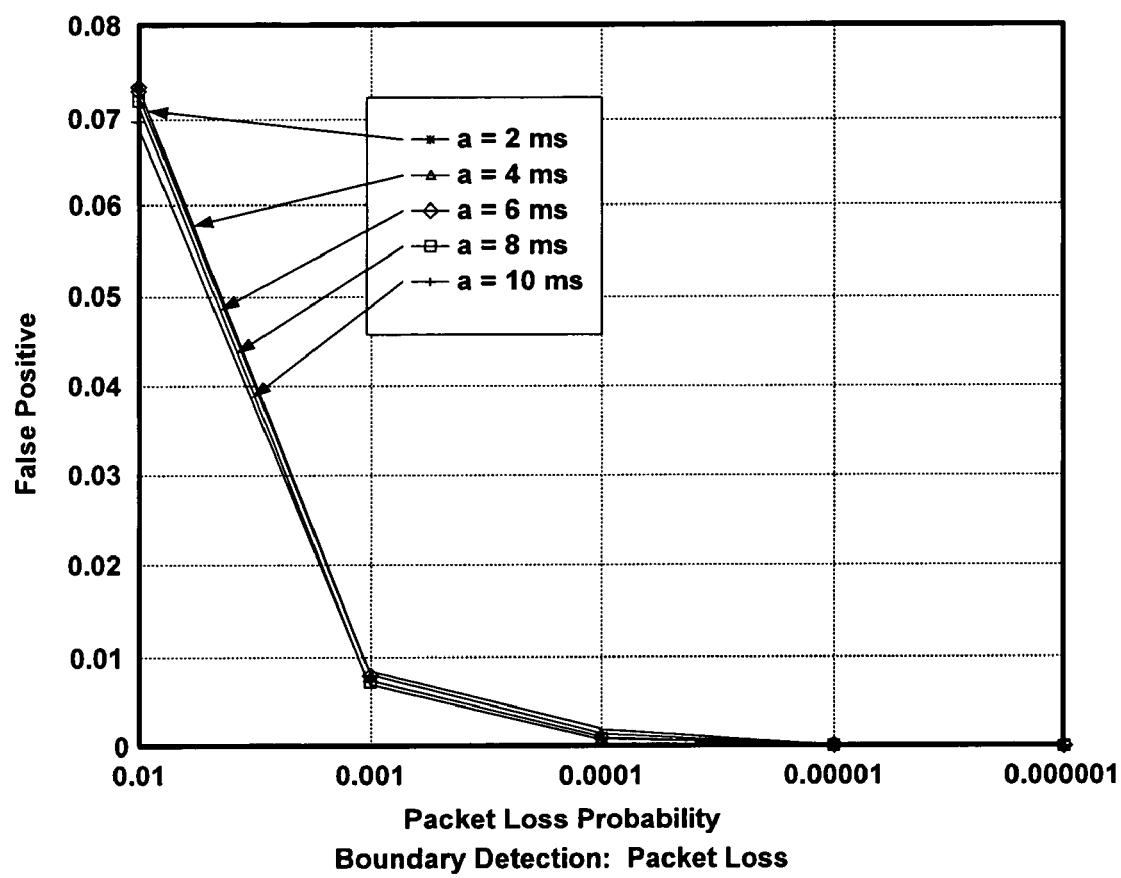
FIG. 16 is a graph showing the boundary detection impact of packet loss using an aspect of an embodiment of the present invention.

Second, the impact of packet loss to boundary detection was studied. Packets were artificially deleted from the data block randomly with the deletion probability of 1=100, 1=1000, 1=10000, 1=100000, and 1=1000000 in the entire packet flow, respectively. Experiments are repeated 100 times to check if a false boundary is found. FIG. 16 shows the result. Roughly, adjustment sizes do not make much difference. As reported in [30], the regular packet loss rate on the Internet is less than 0.1%. So a a of 4 ms can detect the boundary with more than 99% accuracy.

Redundancy Level/BAC Length

In a regular network environment, network fluctuations are common and may cause the extracted BAC bits to be wrong. Thus, it may be important to increase the redundancy of the embedded BAC so that embodiments of the present invention may survive with dramatic network jitter.

First, experiments are conducted to find an appropriate redundancy level for embedding authentication code to the test data streams. The basic BAC bits are 24 bits, and we set the adjustment size as 4 ms. BAC was only added to a data block with 2000 packets, so that different redundancy levels could be tested. Again, data flows were artificially introduced with the uniform and normal jitter with probabilities of 1% and 100%.

Figure 17:
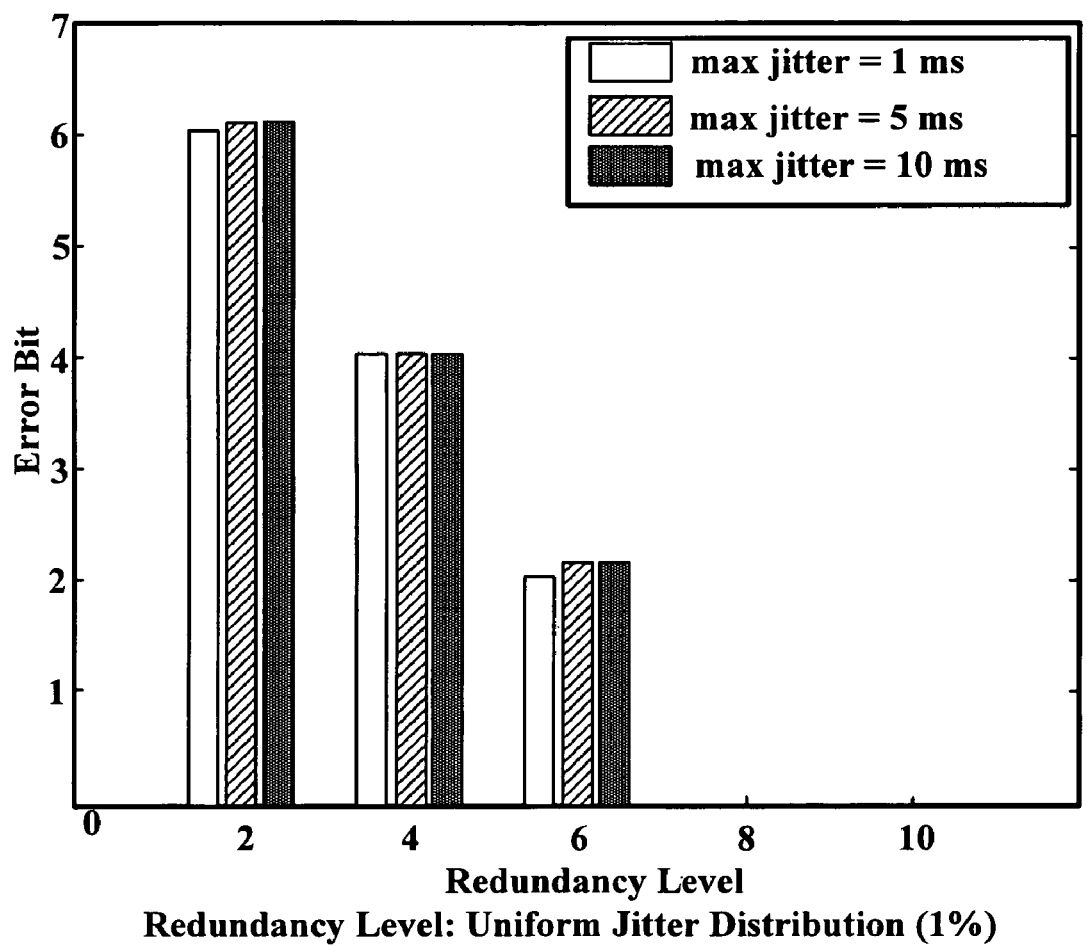
FIG. 17 is a graph showing the number of error bits when the redundancy level varies with a uniform jitter distribution of 1% using an aspect of an embodiment of the present invention.
Figure 18:
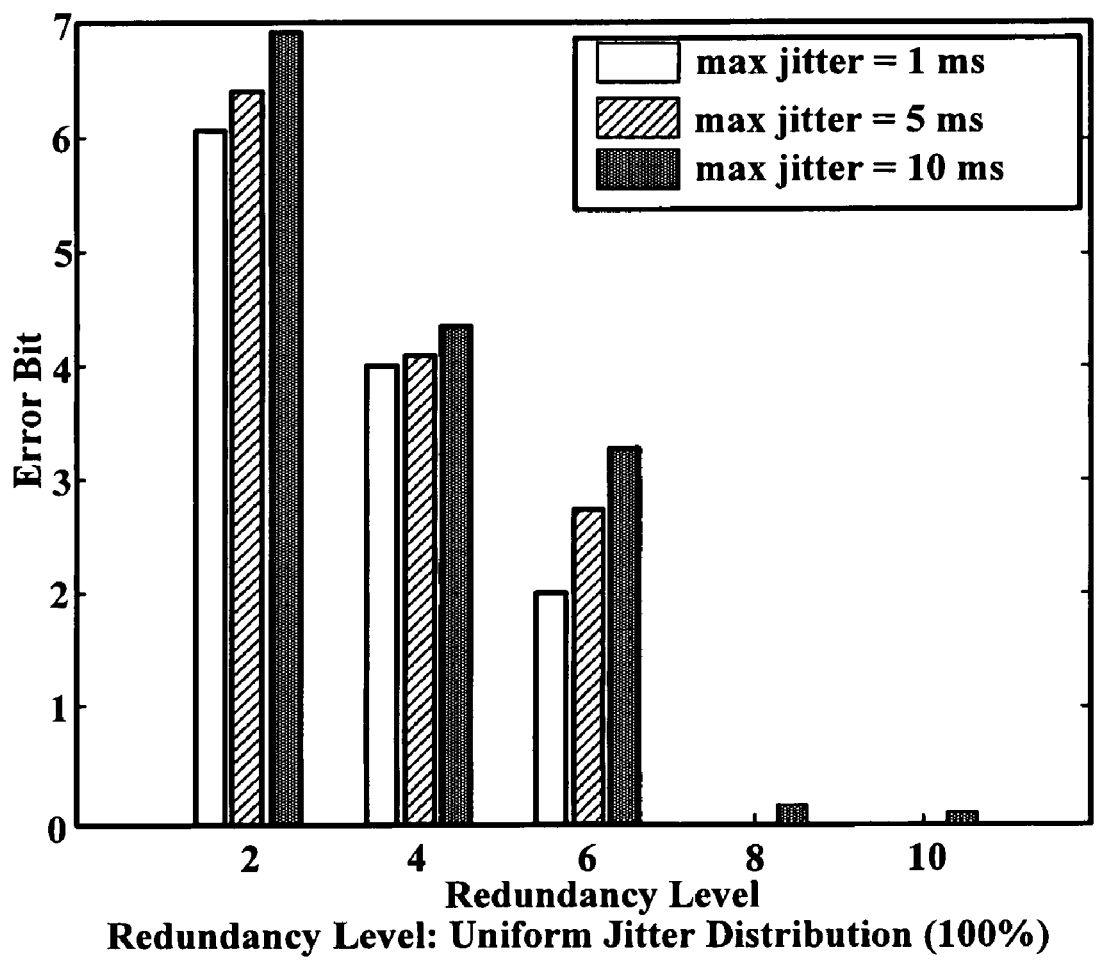
FIG. 18 is a graph showing the number of error bits when the redundancy level varies with a uniform jitter distribution of 100% using an aspect of an embodiment of the present invention.

The error bit was defined as the total number of error bits in the experiments in average. FIG. 17 and FIG. 18 show the number of error bits when the redundancy level varies while the maximum network jitter is 1, 5, and 10 ms, respectively. In general, both figures show that the number of error bits decreases when the redundancy level increases. A more important observation from these two figures is that a redundancy level of 8 produces a nearly 0 error bit in the 24 bits, even when the jitter follows a uniform distribution with the maximum delay in the range of 1-10 ms and 100% packet jitter probability.

As discussed earlier, given a fixed data block size, there may always be a trade-off between the redundancy level and the BAC length. They should be kept in balance. In the following experiments, this was explored by testing a data block consisting of 1000 data packets. Given a block size of 1000 packets, there are a few pairs of the redundancy level and BAC length, including (6, 24), (7,23), (8,20), (9,18), (10, 16).

Because the BAC length varies, when the network jitter follows a uniform distribution in the range of 1-10 ms with the probability of 1% and 100%, experiments were conducted to test the error bit rate. The error bit rate is defined as the total error bits of the 100 experiments divided by the product of the BAC length and the number of experiments.

Figure 19:
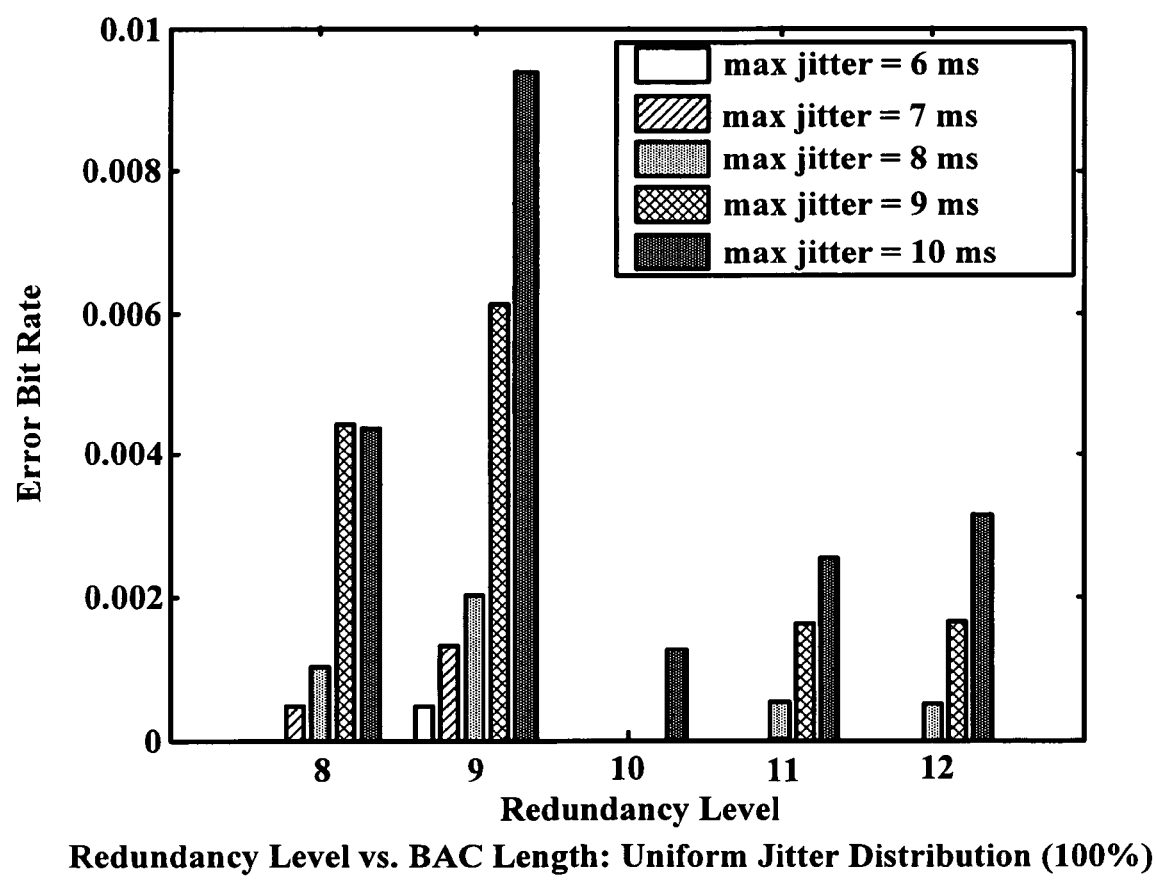
FIG. 19 is a graph showing the error bit rate when the maximum jitter is in the range of 6-10 ms using an aspect of an embodiment of the present invention.

When the packet jitter probability is 1%, the error bit rate is always 0. When the packet jitter probability is 100%, FIG. 19 shows the error bit rate when the maximum jitter is in the range of 6-10 ms. When the maximum jitter is less than 6 ms, the error bit rate is always 0.

As shown in this figure, although in general the error bit rate approaches 0, a redundancy level of 10 clearly achieves the best result with a BAC length of 16 bits. When the redundancy level further increases, the error bit rate increases, since the collision rate increases due to the shortness of the BAC length.

This set of experiments verifies the existence of the tradeoff. Thus, for a fixed block size, the appropriate BAC length and redundancy level should be found to achieve the best authentication performance.

Detect/Locate Content Change

As aforementioned, the BAC in several of the embodiments of the present invention is content based. Ideally, when the content is changed, the extracted BAC should not be consistent with the reference content BAC. However, if due to network fluctuations, the extracted BAC is also changed, and is the same as the new content BAC, a false positive happens. The following two experiments were performed to evaluate these situations by either deleting a packet, or changing a bit in a packet randomly.

Firstly, an experiment upon packet loss was run. For this test, a BAC was first embedded to the workload with the redundancy level of 8 and the adjustment size as 4 ms for the 24 bit BAC. In the embedded workload, packets were dropped randomly. Also, the embedded workload was randomly perturbed with network jitter using the uniform perturbation where the max delay varies from 1 to 10 ms and for each distribution. The experiment ran for 10000 times for each jitter setting to randomly select a packet to drop.

Figure 20:
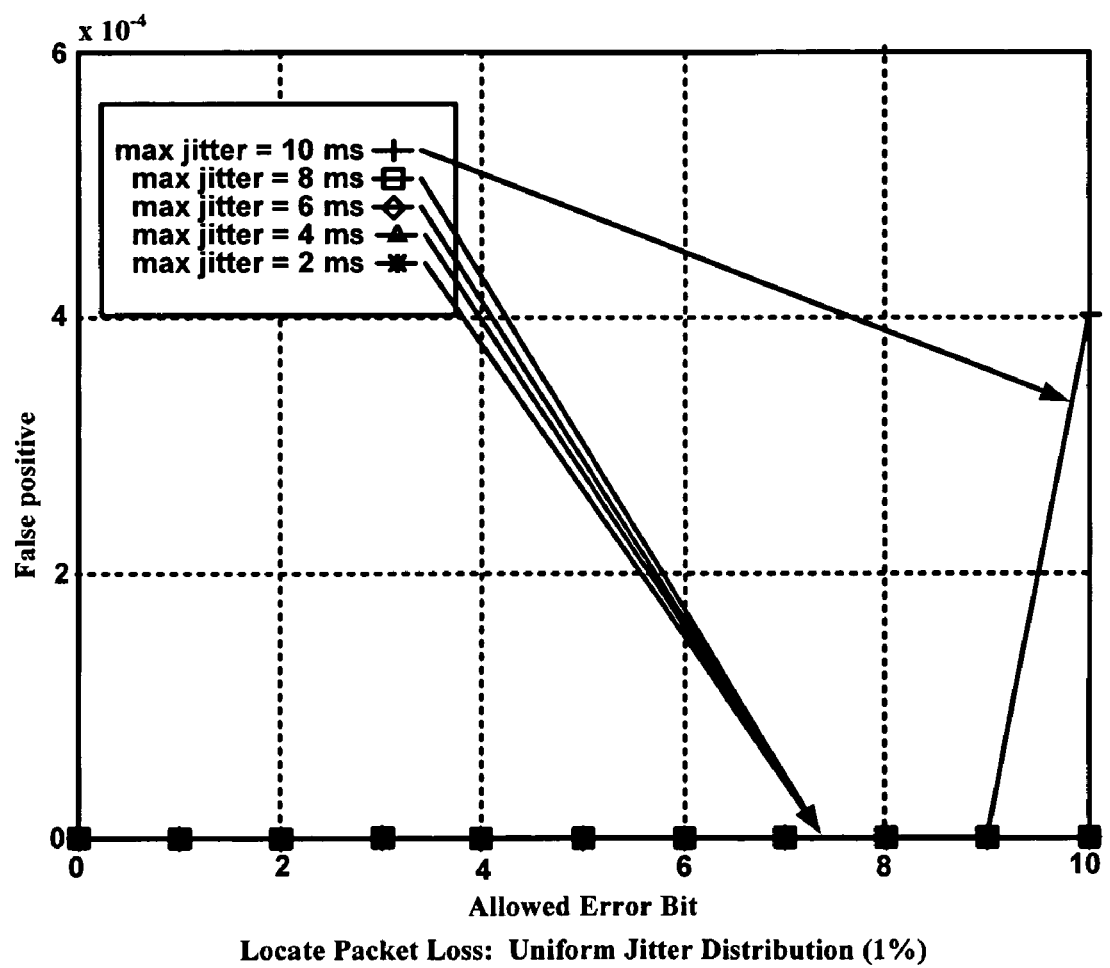
FIG. 20 is a graph showing packet loss with a uniform jitter distribution of 1% probabilities using an aspect of an embodiment of the present invention.
Figure 21:
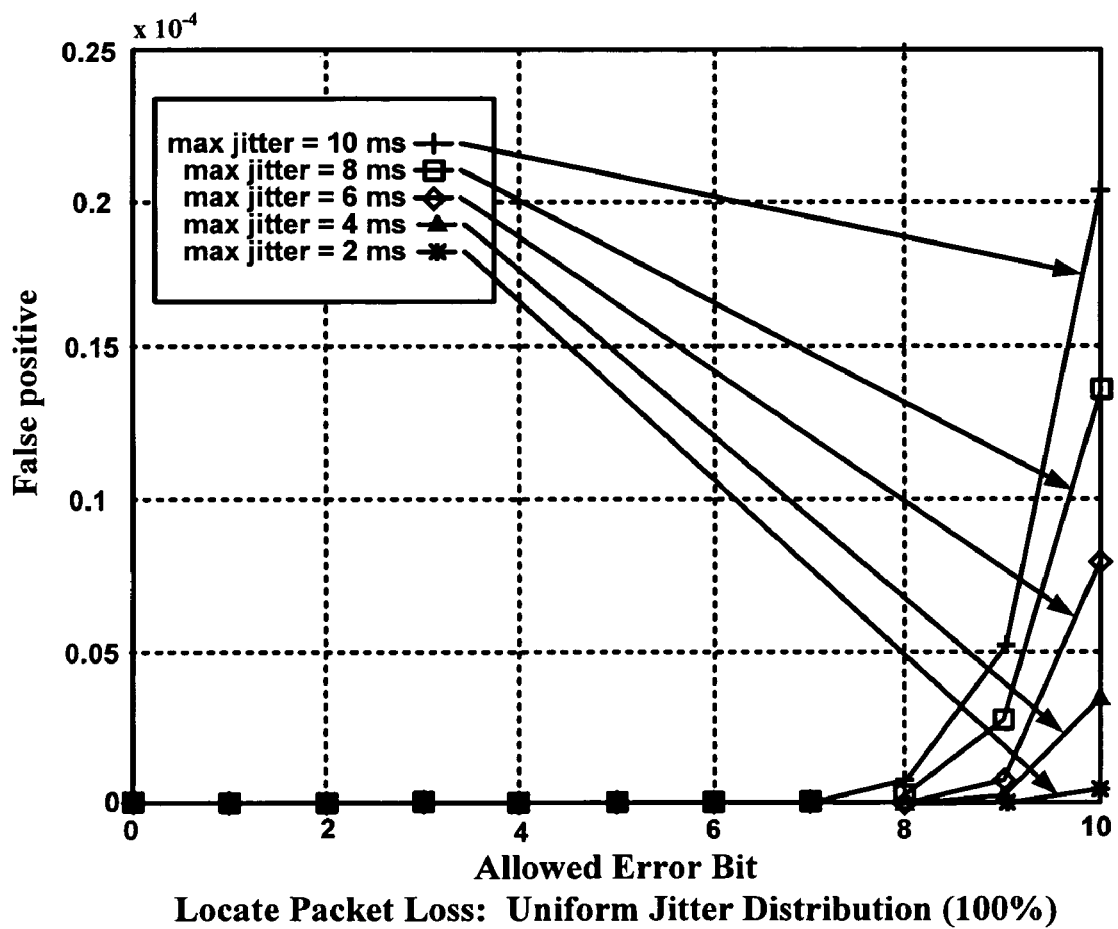
FIG. 21 is a graph showing packet loss with a uniform jitter distribution of 100% probabilities using an aspect of an embodiment of the present invention.

FIG. 20 and FIG. 21 show the result when the jitter in uniform distribution with 1% and 100% probabilities. In these figures, the x-axis represents the allowed error bit. This means how many erroneous BAC bits are allowed to be ignored. An allowed error bit of 0 means that all the 24 BAC bits must be matched. An allowed error bit of 1 means that if only 1 bit is different, the authentication is taken as a success. The y-axis represents false positive, which means a failure to detect and locate a dropped packet. It is expected that the larger the allowed error bit number, the larger the false positive. Both figures indicate that unless the allowed error bit is very large (>8), some embodiments should always successfully locate a packet change in a data block. Note an allowed error bit of 8 means among the 24 BAC bits, ⅓ bits are not required to match. This is not commonly acceptable in normal applications.

Further tests were conducted without deleting a packet, but changing the content of a randomly selected packet and repeated the experiment. The result shows the alteration can be detected with 100% accuracy, with the uniform distribution of 1% or 100%.

Authentication Accuracy

The previous experiments have successfully determined that when the BAC length is 24, an adjustment size of 4 ms and a redundancy level of 8 are good for our experimental data streams. With these fixed parameters, the following experiments are conducted to examine the accuracy, denoted as true positive, of authentication embodiments when the jitter on packets comes with a 1% or 100% probability.

Figure 22:
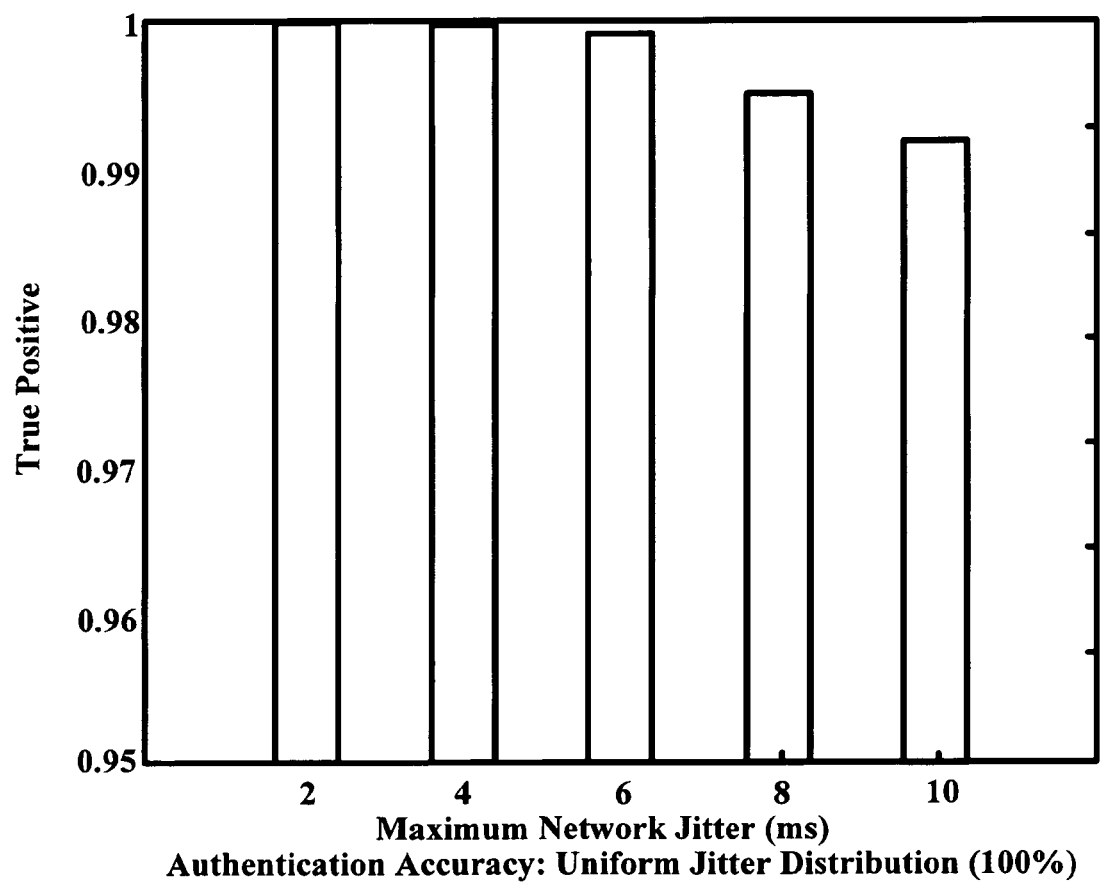
FIG. 22 is a graph showing authentication accuracy with a uniform jitter distribution of 100% probabilities using an aspect of an embodiment of the present invention.

When the jitter follows a uniform distribution with a probability of 1%, the tested embodiments always achieves 100% true positive. Thus, only the true positive for the authentication scheme when the packet jitter probability is 100% is shown in FIG. 22. As shown in the figure, when the maximum jitter increases beyond 4 ms, the tested embodiments may not achieve a 100% true positive. However, even when the maximum jitter is 10 ms, the tested embodiments still achieves a true positive above 99%.

Impact on Applications

Having experimented with embodiments of the present invention with different network fluctuation distributions, block sizes, and redundancy levels, now a series of experiments were conducted to study the impact of the embedded BAC (delay) on sensitive applications.

First, a movie was watched after it is embedded with the 24 bit BAC, redundancy level of 8, and an adjustment size of 4 ms when artificially introduced network jitter follows the uniform or normal distribution with probabilities of 1% and 100%. No jitter was observed, even when a 0-second buffer was setup at the client side. To study the effect scientifically, experiments were conducted to calculate the packet-timestamp difference and inter-packet-delay.

Figure 23:
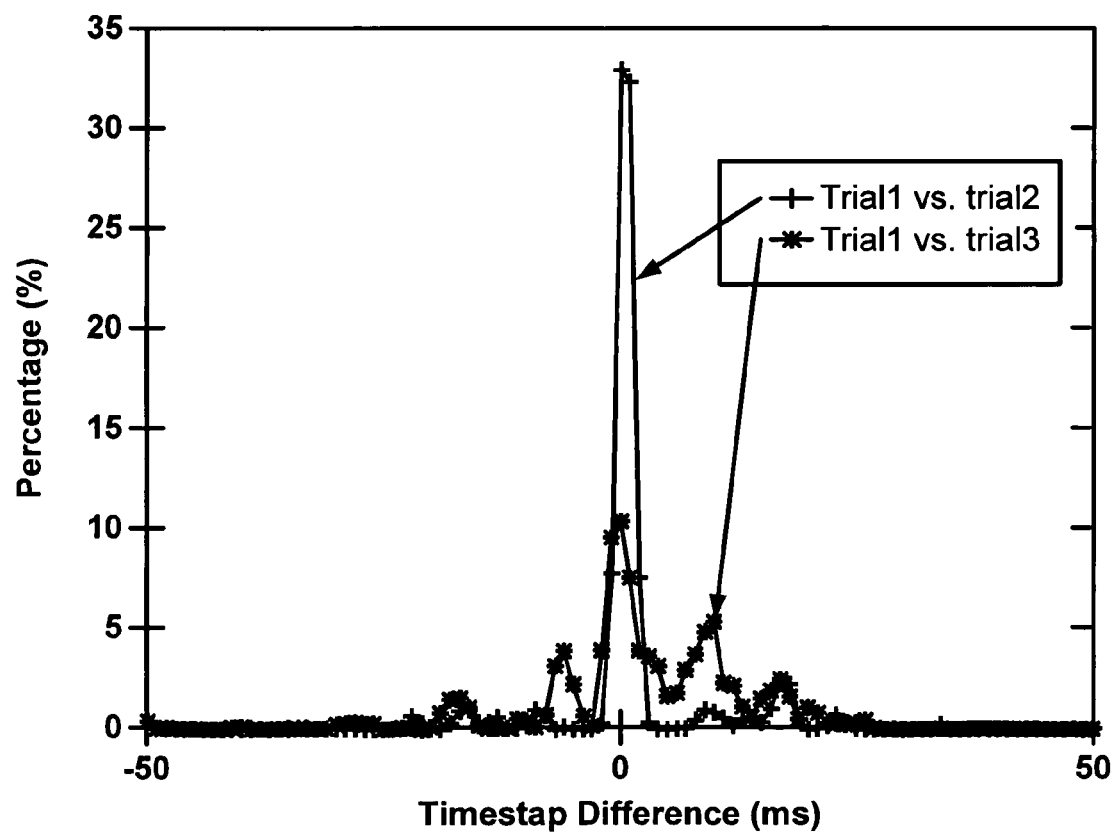
FIG. 23 is a graph showing timestamp differences for three flows using an aspect of an embodiment of the present invention.

FIG. 23 shows the timestamp differences of the three flows, represented by trial1, trial2, and trial3. In trial1, the BAC was not embedded into the original data flow and captured the data packets at the client side. To reflect the network jitter in our experimental environment, we repeated the playback and captured the flow as trial2. trial3 is the flow captured at the receiver side after the original flow is embedded with BAC. Thus, the difference between trial1 and trial2 indicates the local network jitter. The result indicates that network jitter in the local experimental environment is trivial, and thus should not affect the correctness of our conducted experiments. The difference between trial1 and trial3 represents the experimental network jitter and the additional jitter introduced by the authentication embodiments. As shown in the figure, 81% timestamp difference for both scenarios falls into the same range, from −6 to 8 ms. This is trivial to the client side player, particularly when these players normally have a non-zero second buffer.

Figure 24:
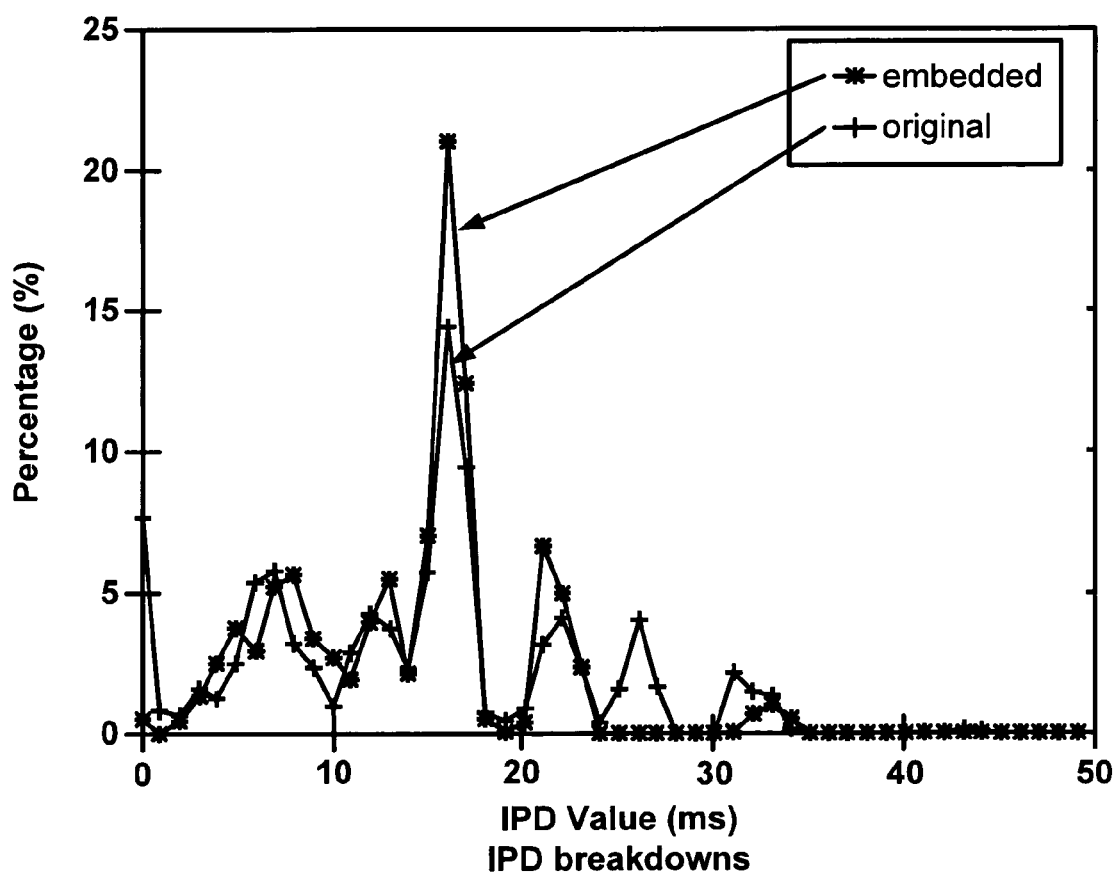
FIG. 24 is a graph showing IPD values of flow captured at the client with or without embedded BAC using an aspect of an embodiment of the present invention.

FIG. 24 further shows the IPD values of the flow captured at the client with or without embedded BAC, denoted by embedded and original. The introduction of a BAC does shift the distribution a little bit (about 1 ms) at the beginning. However, the largest portion of the IPD values is still around 15 ms.

Conclusion

Data streams have been commonly used in many Internet applications, such as grid computing and streaming media. More and more such applications demand a reliable and effective authentication mechanism to ensure the data streams transferred over the Internet are genuine. Although plenty of research work has been conducted, existing work shares the characteristics of either sending the authentication information with the original data or out-of-band, which causes additional communication overhead, particularly when the redundancy is added to deal with packet loss, or embedding authentication into the original data by replacing some non-critical bits, which changes the original data. Embodiments of the present invention utilize a new scheme by adjusting packet timing (delay) to authenticate the data stream. Thus, authentication is done without changing the original packet content and without sending additional authentication information. Extensive experiments were conducted locally and over the Internet based on an implemented prototype of an embodiment of the present invention. The results show that the tested embodiment is robust under various network conditions and practical.

The following references are referred to as an aid to explain and enable the present embodiments: REFERENCES [1] "National hurricane center," http://www.nhc.noaa.gov/; [2] "National oceanic and atmospheric administration," http://www.nesdis.noaa.gov/; [3] CiberStock Quote & Chart/Share Price," http://www.advfn.com/;[4] M. Chesire, A. Wolman, G. Voelker, and H. Levy, "Measurement and analysis of a streaming media workload," in Proc. of the 3rd USENIX-Symposium on Internet Technologies and Systems, March 2001; [5] M. Chen, Y. He, and R. Lagendijk, "A fragile watermark error detection scheme for wireless video communications," in IEEE Transactions on Multimedia, 2003; [6] P. Golle and N. Modadugu, "Authenticating streamed data in the presence of random packet loss," in Proceedings of SPIE Security and Watermarking of Multimedia Contents, San Jose, Calif., January 2001; [7] C. Lu, H. M. Liao, and L. Chen, "Multipurpose audio watermarking," in Proceedings of International Conference on Pattern Recognition (ICPR'00), Barcelona, Spain, September 2000; [8] S. Miner and J. Staddon, "Graph-based authentication of digital streams," in Proceedings of IEEE Symposium on Security and Privacy, 2001; [9] A. Pannetrat and R. Molva, "Real time multicast authentication," in Proceedings of Network and Distributed System Security Symposium (NDSS'03), San Diego, Calif., February 2003; [10] J. Parlk, E. Chong, and H. Siegel, "Efficient multicast packet authentication using signature amortization," in Proceedings of the 2000 IEEE Symposium on Security and Privacy, 2000; [11] A. Perrig, J. D. Tygar, D. Song, and R. Canetti, "Efficient authentication and signing of multicast streams over lossy channels," in Proceedings of the IEEE Symposium on Security and Privacy, 2000; [12] S. Ben-David, J. Gehrke, and D. Kifer, "Detecting change in data streams," in Proceedings of the 30th VLDB Conference, Toronto, Canada, August 2004; [13] R. Gennaro and P. Rohatgi, "How to sign digital streams," in Proceedings of Crypto97, 1997; [14] C. L. Wong and S. S. Lam, "Digital signatures for flows and multicasts," in Proceedings of ICNP, 1998; [15] P. Rohatgi, "A compact and fast hybrid signature scheme for multicast packet authentication," in Proceedings of the 6th ACM Conference on Computer and Communications Security, November 1999; [16] C. Karlof, N. Sastry, Y. Li, A. Perrig, and J. Tygar, "Distillation codes and applications to dos resistant multicast authentication," in Proceedings of Network and Distributed System Security Symposium (NDSS'04), February 2004; [17] Z. Liu, X. Li, and Z. Dong, "Multimedia authentication with sensor based watermarking," in Proceedings of ACM Multimedia Workshop on Security, Magdeburg, Germany, September 2002; [18] L. C. Yung and C. S. Fu, "A robust image authentication method distinguishing jpeg compression from malicious manipulation," in IEEE Transactions on Circuits and Systems for Video Technology, February 2001, vol. 11 (2); [19] J. Brassil, S. Low, N. Maxemchuk, and L. O'Gorman, "Electronic marking and identification techniques to discourage document copying," in Proceedings of IEEE INFOCOM, Toronto, Canada, June 1994; [20] J. Fridrich and M. Du, "Images with self-correcting capabilities," in Proceedings of IEEE International Conference on Inage Processing, 1999; [21] F. H. Hartung and B. Girod, "Watermarking of mpeg-2 encoded video without decoding and reencoding," in Proceedings of SPIE/ACM Conference on Multimedia Computing and Networking, San Jose, Calif., February 1997; [22] S. Cabuk, C. E. Brodley, and C. Shields, "Ip covert timing channels: Design and detection," in Proceedings of CCS, Washington, D.C., October 2004; [23] J. Ioannidis and M. Blaze, "The architecture and implementation of network-layer security under unix," in Proceedings of USENIX Security Symposium, Santa Clara, Calif., October 1993; [24] S. Kent and R. Atkinston, "Rfc 2401: Security architecture for the internet protocol," IETF, September 1998; [25] H. Yin and H. Wang, "Building an application-aware ipsec policy system," in Proceedings of USENIX Security Symposium, Baltimore, Md., August 2005; [26] "Rfc 1321—the md5 message-digest algorithm," http://www.faqs.org/rfcs/rfc1321.html; [27] National Institute of Standards and NIST FIPS PUB 180 Technology, "Secure hash standard," U.S. Department of Commerce, May 1993; [28] X. Wang, S. Chen, and S. Jajodia, "Tracking anonymous peer-to-peer voip calls on the internet," in Proceedings of the 12th ACM Conference on Computer Communications Security, 2005; [29] L. Ciavattone, A. Morton, and G. Ramachandran, "Standardized active measurements on a tier 1 ip backbone," in IEEE Communications Magazine, June 2003; [30] "Global ip network home," http://ipnetwork.bgtmo.ip.att.net/pws/; [31] C. Shannon, D. Moore, and k claffy, "Characteristics of fragmented ip traffic on internet links," in Proceedings of ACM Internet Measurement Workshop, San Francisco, Calif., November 2001; [32] Y. Zhang, V. Paxson, and S. Shenker, "The stationarity of internet path properties: Routing, loss, and throughput," Tech. Rep., 2000; [33] S. Chen, S. P. Chen, X. Wang, and S. Jajodia, "Data—data-transparent authentication without communication overhead," Tech. Rep., Dept. of Computer Science, George Mason University, 2006; [34] "Apple darwin streaming server," http://developer.apple.com/darwin/projects/.

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, the ARCF filter may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement the ARCF filter using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of embedding a block authentication code in a data stream for authentication purposes. However, one skilled in the art will recognize that embodiments of the invention could be used to embed other types of information in the data blocks such as hidden keys or messages. One of many ways that this could be accomplished is by using a specific hash function that results in a value that either directly or in combination with other data can result in one learning this other type of information.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed:

1. A non-transitory computer-readable storage medium tangibly embodying a program of instructions executable by a computer to perform a method for embedding a block authentication code into stream data, the method comprising:
   a) dividing a stream message into a sequence of data blocks, the sequence of data blocks including:
      i) a first data block;
      ii) a second data block being the block immediately after the first data block; and iii) a third data block being the block immediately after the second data block;
b) generating the block authentication code for the second data block, the block authentication code having n bits, the generating including:
   i) determining a first digest using:
      (1) the first data block;
      (2) part of the second data block;
      (3) a key; and
      (4) a hash function;
   ii) determining a second digest by concatenating:
      (1) the first digest; and
      (2) a flag;
   iii) determining a third digest using:
      (1) the second data block;
      (2) part of the third data block;
      (3) the key; and
      (4) the hash function;
   iv) determining a fourth digest by concatenating:
      (1) the third digest; and
      (2) the flag;
   v) taking an exclusive OR of:
      (1) the last n bits of the second digest; and
      (2) the first n bits of the fourth digest; and
c) embedding the block authentication code into the timing of the second data block by adjusting inter-packet delays between packets in the second data block.

2. The medium as in claim 1, wherein the hash function is one of the following:
a) a SHA-1 hash function;
b) an MD5 hash function;
c) elf64;
d) HAVAL;
e) RIPEMD;
f) SHA256;
g) Tiger; and
h) Whirlpool.

3. The medium as in claim 1, wherein:
a) the sequence of data blocks further includes a fourth data block, a fourth data block being the block immediately after the third data block;
b) the second data block becoming the first data block;
c) the third data block becoming the second data block;
d) the fourth data block becoming the third data block; and
e) repeating the actions of claim 1.

4. The medium as in claim 1, wherein the block authentication code is a redundant block authentication code.

5. The medium as in claim 1, wherein the embedding the block authentication code into the timing of the second data block by adjusting inter-packet delays between packets in the second data block includes:
a) embedding a '1' by increasing at least one of the inter-packet delays; and
b) embedding a '0' by decreasing at least one of the inter-packet delays.

6. A non-transitory computer-readable storage medium tangibly embodying a program of instructions executable by a computer to perform a method for authenticating data stream data, the method comprising:
a) dividing a received data stream into sequence of data blocks, the sequence of data blocks separated by an inter-block delay, the sequence of data blocks including:
   i) a first data block;
   ii) a second data block being the block immediately after the first data block; and
   iii) a third data block being the block immediately after the second data block;
b) extracting an extracted block authentication code from the second data block, the extracting including measuring inter-packet delays between packets in the second data block;
c) generating a content-based block authentication code for the second data block, the generating including:
   i) determining a first digest using:
      (1) the first data block;
      (2) part of the second data block;
      (3) a key; and
      (4) a hash function;
   ii) determining a second digest by concatenating:
      (1) the first digest; and
      (2) a flag having f bits;
   iii) determining a third digest using:
      (1) the second data block;
      (2) part of the third data block;
      (3) the key; and
      (4) the hash function;
   iv) determining a fourth digest by concatenating:
      (1) the third digest; and
      (2) the flag;
   v) taking an exclusive OR of:
      (1) the last n bits of the second digest; and
      (2) the first n bits of the fourth digest; and
d) comparing the content-based block authentication code with the extracted block authentication code by:
   i) dividing the content-based block authentication code into a first part and a second part, the first part including the first (n−f) bits of the determined block authentication code, the second part being the last f bits of the determined block authentication code; and
   ii) dividing the extracted block authentication code into a third part and a fourth part, the third part including the first (n−f) bits of the extracted block authentication code, the second part being the last f bits of the extracted block authentication code.

7. The medium as in claim 6, wherein the hash function is one of the following:
a) a SHA-1 hash function;
b) an MD5 hash function;
c) elf64;
d) HAVAL;
e) RIPEMD;
f) SHA256;
g) Tiger; and
h) Whirlpool.

8. The medium as in claim 6, wherein:
a) the sequence of data blocks further includes a fourth data block, a fourth data block being the block immediately after the third data block;
b) the second data block becoming the first data block;
c) the third data block becoming the second data block;
d) the fourth data block becoming the third data block; and
e) repeating the actions of claim 6.

9. The medium as in claim 6, wherein:
a) the content-based block authentication code is a redundant content-based block authentication code; and
b) the extracted block authentication code is a redundant extracted block authentication code.

10. The medium as in claim 6, wherein:
a) a measured inter-packet delay that is greater than a first temporal threshold represents a '1'; and
b) a measured inter-packet delay that is less than a second temporal threshold represents a '0'.

11. The medium as in claim 6, further including indicating at least one of the following conditions:
 a) that the content of the second data block has not changed if:
  i) the second part and the fourth part match;
 b) that the content of the second data block has not changed if:
  i) the first part and the third part match; and
  ii) the second part and the fourth part match;
 c) that the first data block was not lost if:
  i) the first part and the third part match; and
  ii) the second part and the fourth part match;
 d) that the second data block has changed if:
  i) the first part and the third part match; and
  ii) the second part and the fourth part do not match;
 e) that the first data block was lost, deleted or altered if:
  i) the first part and the third part do not match; and
  ii) the second part and the fourth part match;
 f) that the second data block has changed if: and
  i) the first part and the third part do not match; and
  ii) the second part and the fourth part do not match.

12. A device for embedding a block authentication code into a stream data, comprising:
 a) a data stream to data block conversion module configured to divide a data stream into a sequence of data blocks, the sequence of data blocks including:
  i) a first data block;
  ii) a second data block being the block immediately after the first data block; and
  iii) a third data block being the block immediately after the second data block;
 b) a block authentication code generation module configured to generate a block authentication code for the second data block, the generating including:
  i) a first digest determination module configured to determine a first digest using:
   (1) the first data block;
   (2) part of the second data block;
   (3) a key; and
   (4) a hash function;
  ii) a second digest determination module configured to determine a second digest by concatenating:
   (1) the first digest; and
   (2) a flag;
  iii) a third digest determination module configured to determine a third digest using:
   (1) the second data block;
   (2) part of the third data block;
   (3) the key; and
   (4) the hash function;
  iv) a fourth digest determination module configured to determine a fourth digest by concatenating:
   (1) the third digest; and
   (2) the flag;
  v) an exclusive-OR module configured to determine an n-bit sized block authentication code by taking an exclusive OR of:
   (1) the last n bits of the second digest; and
   (2) the first n bits of the fourth digest; and
 c) a block authentication code insertion module configured to embed the block authentication code into the timing of the second data block by adjusting inter-packet delays between packets in the second data block.

13. The device as in claim 12, wherein the hash function is one of the following:
 a) a SHA-1 hash function;
 b) an MD5 hash function;
 c) elf64;
 d) HAVAL;
 e) RIPEMD;
 SHA256;
 g) Tiger; and
 h) Whirlpool.

14. The device as in claim 12, wherein:
 a) the sequence of data blocks further includes a fourth data block, a fourth data block being the block immediately after the third data block;
 b) the second data block becoming the first data block;
 c) the third data block becoming the second data block;
 d) the fourth data block becoming the third data block; and
 e) the system operates on the new first data block, second data block and third data block.

15. The device as in claim 12, wherein the block authentication code is a redundant block authentication code.

16. The device as in claim 12, wherein the insertion module configured to embed the block authentication code into the timing of the second data block by adjusting inter-packet delays between packets in the second data block is further configured to:
 a) embed a '1' by increasing at least one of the inter-packet delays; and
 b) embed a '0' by decreasing at least one of the inter-packet delays.

17. A data stream authentication device, comprising:
 a) a data stream to data block conversion module configured to divide a received data stream into a sequence of data blocks, the sequence of data blocks separated by an inter-block delay, the sequence of data blocks including:
  i) a first data block;
  ii) a second data block being the block immediately after the first data block; and
  iii) a third data block being the block immediately after the second data block;
 b) a block authentication code extraction module configured to extract an extracted block authentication code from the second data block, the extracting including measuring inter-packet delays between packets in the second data block;
 c) a block authentication code generation module configured to generate a content-based block authentication code for the second data block, the block authentication code generation module including:
  i) a first digest determination module configured to determine a first digest using:
   (1) the first data block;
   (2) part of the second data block;
   (3) a key; and
   (4) a hash function;
  ii) a second digest determination module configured to determine a second digest by concatenating:
   (1) the first digest; and
   (2) a flag having f bits;
  iii) a third digest determination module configured to determine a third digest using:
   (1) the second data block;
   (2) part of the third data block;
   (3) the key; and
   (4) the hash function;
  iv) a fourth digest determination module configured to determine a fourth digest by concatenating:
   (1) the third digest; and
   (2) the flag;

v) an exclusive-OR module configured to determine an n-bit sized determined block authentication code by taking an exclusive OR of:
(1) the last n bits of the second digest; and
(2) the first n bits of the fourth digest; and
d) a block code authentication comparison module configured to compare the content-based block authentication code with the extracted block authentication code, the block code authentication comparison module including:
i) a content-based block authentication code division module configured to divide the content-based block authentication code into a first part and a second part, the first part including the first (n−f) bits of the content-based block authentication code, the second part being the last f bits of the content-based block authentication code; and
ii) an extracted block authentication code division module configured to divide the extracted block authentication code into a third part and a fourth part, the third part including the first (n−f) bits of the extracted block authentication code, the fourth part being the last f bits of the extracted block authentication code.

18. The device as in claim 17, wherein the hash function is one of the following:
a) a SHA-1 hash function;
b) an MD5 hash function;
c) elf64;
d) HAVAL;
e) RIPEMD;
f) SHA256;
g) Tiger; and
h) Whirlpool.

19. The device as in claim 17, wherein:
a) the sequence of data blocks further includes a fourth data block, a fourth data block being the block immediately after the third data block;
b) the second data block becoming the first data block;
c) the third data block becoming the second data block;
d) the fourth data block becoming the third data block; and
e) the system operates on the new first data block, second data block and third data block.

20. The device as in claim 17, wherein:
a) the content-based block authentication code is a redundant content-based block authentication code; and
b) the extracted block authentication code is a redundant extracted block authentication code.

21. The device as in claim 17, wherein:
a) a measured inter-packet delay that is greater than a first temporal threshold represents a '1'; and
b) a measured inter-packet delay that is less than a second temporal threshold represents a '0'.

22. The device as in claim 17, wherein the block code authentication comparison module is further configured to indicate at least one of the following conditions:
a) that the content of the second data block has not changed if:
i) the second part and the fourth part match;
b) that the content of the second data block has not changed if:
i) the first part and the third part match; and
ii) the second part and the fourth part match;
c) that the first data block was not lost if:
i) the first part and the third part match; and
ii) the second part and the fourth part match;
d) that the second data block has changed if:
i) the first part and the third part match; and
ii) the second part and the fourth part do not match;
e) that the first data block was lost, deleted or altered if:
i) the first part and the third part do not match; and
ii) the second part and the fourth part match; and
f) that the second data block has changed if:
i) the first part and the third part do not match; and
ii) the second part and the fourth part do not match.

* * * * *